United States Patent
Liu et al.

(10) Patent No.: US 12,541,018 B2
(45) Date of Patent: Feb. 3, 2026

(54) SIGNAL TRANSMISSION METHOD AND APPARATUS, SIGNAL PROCESSING METHOD AND APPARATUS, AND RADAR SYSTEM

(71) Applicant: SHENZHEN YINWANG INTELLIGENT TECHNOLOGIES CO., LTD., Shenzhen (CN)

(72) Inventors: Jinnan Liu, Shenzhen (CN); Mu Zhou, Shanghai (CN); Dapeng Lao, Beijing (CN); Chen Yang, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 690 days.

(21) Appl. No.: 17/675,743

(22) Filed: Feb. 18, 2022

(65) Prior Publication Data
US 2022/0171050 A1    Jun. 2, 2022

Related U.S. Application Data

(63) Continuation of application No. PCT/CN2019/101408, filed on Aug. 19, 2019.

(51) Int. Cl.
*G01S 13/58* (2006.01)
*G01S 7/35* (2006.01)

(52) U.S. Cl.
CPC ............ *G01S 13/583* (2013.01); *G01S 7/354* (2013.01)

(58) Field of Classification Search
CPC ................ G01S 13/583; G01S 7/354
USPC ........................................... 342/104
See application file for complete search history.

(56) References Cited

U.S. PATENT DOCUMENTS

| | | | |
|---|---|---|---|
| 8,747,336 B2* | 6/2014 | Tran ..................... | A61B 5/6807 600/595 |
| 9,709,674 B2* | 7/2017 | Moriuchi ............... | G01S 13/726 |
| 9,834,212 B2* | 12/2017 | Park ........................ | H04L 67/12 |
| 10,551,207 B2* | 2/2020 | Bigio ................. | G01C 21/3635 |
| 11,054,516 B2* | 7/2021 | Wu .......................... | G01S 7/354 |
| 11,075,786 B1* | 7/2021 | Shattil .................... | H04B 7/024 |
| 2016/0131752 A1* | 5/2016 | Jansen .................... | G01S 13/42 342/27 |

(Continued)

FOREIGN PATENT DOCUMENTS

| | | | | |
|---|---|---|---|---|
| CN | 102970271 A | | 3/2013 | |
| CN | 104181517 A | * | 12/2014 | ............... G01S 7/35 |

(Continued)

OTHER PUBLICATIONS

Office Action in Japanese Appln. No. 2023-21311, mailed on Apr. 15, 2025, 51 pages (with English translation).

(Continued)

*Primary Examiner* — Nuzhat Pervin
(74) *Attorney, Agent, or Firm* — Fish & Richardson P.C.

(57) ABSTRACT

The disclosure provides signal transmission methods, signal processing methods, apparatuses, and a radar system. One example signal transmission method is applied to a multiple input multiple output (MIMO) radar. A transmitter in the MIMO radar sends a measurement frame used to measure a velocity of a target. The measurement frame includes a first burst. In the first burst, each low-density transmit antenna sends one chirp signal in each timeslot, and at least one high-density transmit antenna sends more chirp signals in additional timeslots.

26 Claims, 6 Drawing Sheets

(56) References Cited

U.S. PATENT DOCUMENTS

| | | | |
|---|---|---|---|
| 2017/0254879 A1* | 9/2017 | Tokieda, I | G01S 7/352 |
| 2018/0172813 A1* | 6/2018 | Rao | G01S 13/343 |
| 2018/0329054 A1* | 11/2018 | Pokrass | G01S 13/26 |
| 2018/0372504 A1* | 12/2018 | Singhal | G08G 1/0129 |
| 2019/0044485 A1* | 2/2019 | Rao | G01S 13/931 |
| 2019/0212428 A1* | 7/2019 | Santra | G01S 7/4865 |
| 2020/0049815 A1* | 2/2020 | Longman | G01S 13/931 |
| 2020/0233076 A1* | 7/2020 | Chen | G01S 13/584 |
| 2020/0241125 A1* | 7/2020 | Sivadas | G01S 13/532 |
| 2021/0072362 A1* | 3/2021 | Gassend | G01S 7/4813 |
| 2021/0255279 A1* | 8/2021 | Goswami | G01S 13/536 |
| 2023/0047968 A1* | 2/2023 | Jácome Muñoz | G01S 13/42 |
| 2023/0048316 A1* | 2/2023 | Giere | G01S 7/354 |
| 2023/0406122 A1* | 12/2023 | Lenius | B60L 53/12 |

FOREIGN PATENT DOCUMENTS

| | | | | |
|---|---|---|---|---|
| CN | 104569924 | B | 1/2017 | |
| CN | 107132529 | A | 9/2017 | |
| CN | 107923963 | A | 4/2018 | |
| CN | 108141294 | A | 6/2018 | |
| CN | 108387877 | A | 8/2018 | |
| CN | 109923433 | A | 6/2019 | |
| CN | 110058218 | A | 7/2019 | |
| EP | 3482222 | B1 * | 9/2023 | G01S 7/354 |
| JP | 2016003873 | A | 1/2016 | |
| JP | 2017112500 | A | 6/2017 | |
| JP | 2017173227 | A | 9/2017 | |
| JP | 2019074404 | A | 5/2019 | |

OTHER PUBLICATIONS

Clark, "The Chinese Remainder Theorem and Multi-PRF Radars," Royal Signals and Radar Establishment: Memorandum 3650, May 17, 1984, 12 pages.

Extended European Search Report issued in European Application No. 19942160.3 on Jul. 19, 2022, 12 pages.

Hu et al., "A Multi-Carrier-Frequency Random-Transmission Chirp Sequence for TDM MIMO Automotive Radar," IEEE Transactions on Aerospace and Electronic System, vol. 68, No. 4, Apr. 2019, 14 pages.

Ulrich et al., "Wavelength-Diverse MIMO Radar: Parameter-Coupling Array-Carrier Optimization and Direction-of-Arrival Estimation," IEEE Transactions on Aerospace and Electronic Systems, vol. 55, No. 4, Nov. 2018, 14 pages.

Office Action issued in Chinese Application No. 201980059673.5 on Sep. 15, 2021, 14 pages (with English translation).

PCT International Search Report and Written Opinion issued in International Application No. PCT/CN2019/101408 on May 21, 2020, 16 pages (with English translation).

Roos et al., "Enhancement of Doppler Unambiguity for Chirp-Sequence Modulated TDM-MIMO Radars," 2018 IEEE MTT-S International Conference on Microwaves for Intelligent Mobility (ICMIM), Apr. 2018, 4 pages.

Silva et al., "Performance Analysis of the Classic and Robust Chinese Remainder Theorems in Pulsed Doppler Radars," IEEE Transactions on Signal Processing, vol. 66, No. 18, Aug. 2018, 6 pages.

Office Action in Japanese Appln. No. 2022-511089, dated Mar. 6, 2023, 13 pages (with English translation).

* cited by examiner

Example a

Example b 1  1 2 3  1 4 5 6  1 7 8 9  1 10 11 12

SIGNAL TRANSMISSION METHOD AND APPARATUS, SIGNAL PROCESSING METHOD AND APPARATUS, AND RADAR SYSTEM

CROSS-REFERENCE TO RELATED APPLICATIONS

This application is a continuation of International Application No. PCT/CN2019/101408, filed on Aug. 19, 2019, the disclosure of which is hereby incorporated by reference in its entirety.

TECHNICAL FIELD

This application relates to the field of sensor technologies, and in particular, to a signal transmission method and apparatus, a signal processing method and apparatus, and a radar system.

BACKGROUND

An on-board radar is an indispensable sensor in an automated driving system. A vehicle may be provided with obstacle (which may also be referred to as a target) detection by using the on-board radar. Specifically, a distance, a velocity, and an azimuth angle of an obstacle around the vehicle may be detected.

In recent years, an on-board radar technology has evolved continuously. For example, a frequency band gradually evolves from 24 GHz to 77 GHz/79 GHz, to obtain a higher distance resolution by using a larger sweep bandwidth. A quantity of channels evolves from a single input multiple output (single input multiple output, SIMO) mode to a multiple input multiple output (multiple input multiple output, MIMO) mode, to expand a virtual antenna aperture and improve an angular resolution.

In a MIMO radar, a plurality of antennas may send chirp (chirp) signals in a time division multiplexing (time division multiplexing, TDM) manner. Although the MIMO radar can improve the angular resolution, the MIMO radar has a problem of decreasing a maximum velocity measurement range. Generally, a maximum velocity measurement range of a radar may be expressed as $Vmax=\lambda/4*Tc$, where $\lambda$ is a wavelength for frequency modulation, and Tc is a transmission repetition period of a same antenna. It is assumed that a duration of sending one chirp by a single antenna is Tc_SIMO (which may be referred to as a timeslot). Then, in a TDM MIMO radar, when Nt antennas send Nt chirp signals in the TDM manner, a required time Tc_MIMO meets $Tc\_MIMO \geq Nt*Tc\_SIMO$. Therefore, a relationship between a maximum velocity measurement range Vmax_MIMO when the Nt antennas are configured to send chirp and a maximum velocity measurement range Vmax_SIMO when the single antenna is configured to send chirp (that is, a velocity measurement range of a SIMO radar) may be expressed as $Vmax\_SIMO \geq Nt*Vmax\_MIMO$. It can be learned from the foregoing formula that, in the MIMO radar, due to a larger quantity of transmit antennas, the maximum velocity measurement range is decreased relative to that of the SIMO radar. Moreover, a larger quantity Nt of transmit antennas indicates a more serious problem of decreasing the maximum velocity measurement range. When the maximum velocity measurement range is decreased, velocity aliasing is more likely to occur when a velocity of a target is calculated. In addition, due to measurement coupling between a velocity and an angle in the TDM MIMO radar, the velocity aliasing affects angle solution, resulting in failure to achieve the desired objective of improving the angular resolution.

In conclusion, a signal transmission and processing solution for the MIMO radar is urgently needed, so that the MIMO radar can accurately resume a velocity measurement of a target to the velocity measurement range of the SIMO radar.

SUMMARY

Embodiments of this application provide a signal transmission method and apparatus, a signal processing method and apparatus, and a radar system, so that a MIMO radar can accurately resume a velocity measurement of a target to a velocity measurement range of a SIMO radar.

According to a first aspect, an embodiment of this application provides a signal transmission method. The method is applied to a multiple input multiple output (MIMO) radar, the MIMO radar includes a transmitter, and the transmitter includes Nt transmit antennas. The signal transmission method includes: The transmitter sends a measurement frame. The measurement frame is used to measure a velocity of a target, and the measurement frame includes a first burst. In the first burst, each of the Nt transmit antennas is configured to send a chirp (chirp) signal at a period of $N1*T1$, $N1>Nt$, and T1 is a duration of each chirp signal in the first burst.

The measurement frame may be a frequency modulated continuous wave FMCW.

According to the foregoing solution, different densities of sending by the transmit antennas can be implemented.

If a high-density transmit antenna (which may be, for example, a first transmit antenna) sends N1–Nt chirp signals continuously, a phase difference between receive antennas corresponding to a soft overlapping moment is determined only by a doppler (doppler) phase caused by a velocity of a target. Therefore, a corresponding velocity aliasing coefficient can be directly obtained by matching by using a velocity identifier of the target that is calculated on the first transmit antenna with a relatively large transmission density, to determine the velocity of the target.

If a high-density transmit antenna (which may be, for example, a first transmit antenna) transmits N1–Nt chirp signals periodically, because a maximum velocity measurement range of a received echo signal corresponding to the high-density transmit antenna is large, a smaller transmission repetition period may be formed during sending of the high-density transmit antenna, and when a spectrum peak search method is used, a quantity of velocity aliasing coefficients of the received echo signal corresponding to the high-density transmit antenna is less than that of SIMO. The received echo signal corresponding to the high-density transmit antenna is used to assist with target velocity calculation in combination with a received echo signal corresponding to a low-density transmit antenna, so that an aliasing coefficient interval range during angular spectrum peak search can be narrowed, and calculation complexity can be reduced.

Therefore, according to the signal transmission method provided in the first aspect, a maximum velocity measurement range of the MIMO radar can be resumed to a velocity measurement range of the SIMO, without affecting subsequent angle measurement. In an actual application, after the velocity of the target is calculated, further calculation needs to be performed based on data on each receive channel after doppler compensation, to obtain an azimuth angle (for example, including a horizontal azimuth angle and a vertical azimuth angle) of the target, so as to obtain distance, velocity, and angle information of the target. Therefore, accuracy of velocity calculation greatly affects azimuth angle calculation. According to the method provided in this embodiment of this application, accuracy of the azimuth angle calculation can be ensured, and an angular resolution can be improved.

In a possible design, in the first burst, a first transmit antenna of the Nt transmit antennas is further configured to send a chirp signal at a period of $M1*T1$, and $M1<N1$. In the foregoing manner of sending a chirp signal, different densities of sending by the transmit antennas can be implemented. A transmission density of the first transmit antenna is relatively large, and a transmission density of another transmit antenna is relatively small. Because a maximum velocity measurement range of a received echo signal corresponding to a high-density transmit antenna is large, a smaller transmission repetition period may be formed during sending of the high-density transmit antenna, and when a spectrum peak search method is used, a quantity of velocity aliasing coefficients of the received echo signal corresponding to the high-density transmit antenna is less than that of SIMO. The received echo signal corresponding to the high-density transmit antenna is used to assist with target velocity calculation in combination with a received echo signal corresponding to a low-density transmit antenna, so that an aliasing coefficient interval range during angular spectrum peak search can be narrowed, and calculation complexity can be reduced.

In a possible design, in the first burst, the first transmit antenna is further configured to send a chirp signal at a period of $M2*T1$, $M2<N1$, and M1 and M2 are co-prime. In the foregoing solution, velocity resolutions of two groups of identifiers determined based on echo signals formed after two groups of chirp signals sent by the first transmit antenna at high densities are reflected are the same. Because M1 and M2 are co-prime, and in a staggered algorithm, any two co-prime integer equations have a solution, according to the foregoing solution, a velocity measurement range of the MIMO radar can be expanded by using a Chinese remainder method (staggered algorithm).

In addition, optionally, the measurement frame may further include a second burst. In the second burst, each of the Nt transmit antennas is configured to send a chirp signal at a period of $N2*T2$, a second transmit antenna of the Nt transmit antennas is further configured to send a chirp signal at a period of $M3*T2$, $M3<N2$, T2 is a duration of each chirp signal in the second burst, and $M3*T2$ and $M1*T1$ are co-prime, or M3 and M1 are co-prime and T1 and T2 are equal. According to the foregoing solution, velocity resolutions of two groups of identifiers determined respectively based on an echo signal formed after the chirp signal sent by the first transmit antenna at a high density is reflected and an echo signal formed after the chirp signal sent by the second transmit antenna at a high density is reflected are the same. Because $M3*T2$ and $M1*T1$ are co-prime or M3 and M1 are co-prime, and in a staggered algorithm, any two co-prime integer equations have a solution, according to the foregoing solution, a velocity measurement range of the MIMO radar can be expanded by using a Chinese remainder method (staggered algorithm).

In addition, optionally, the measurement frame may further include a third burst. In the third burst, each of the Nt transmit antennas is configured to send a chirp signal at a period of $N3*T3$, T3 is a duration of each chirp signal in the third burst, and $N3*T3$ and $M1*T1$ are co-prime, or N3 and M1 are co-prime and T1 and T3 are equal. Because $N3*T3$ and $M1*T1$ are co-prime or N3 and M1 are co-prime, and in a staggered algorithm, any two co-prime integer equations have a solution, according to the foregoing solution, a velocity measurement range of the MIMO radar can be expanded by using a Chinese remainder method (staggered algorithm).

In a possible design, at least one of the Nt transmit antennas continuously sends two chirp signals in the first burst. In the foregoing implementation, a phase difference between receive antennas corresponding to two or more adjacent timeslots at a soft overlapping moment is determined only by a doppler (doppler) phase caused by a velocity of a target. Therefore, a corresponding velocity aliasing coefficient can be directly obtained by matching by using a velocity identifier of the target that is calculated on the first transmit antenna with a relatively large transmission density, to determine an aliased velocity of the target within a velocity measurement range of SIMO.

In a possible design, the MIMO radar may further include a processing unit, and the method further includes: The processing unit determines a configuration of the measurement frame, and sends the configuration of the measurement frame to a monolithic microwave integrated circuit (MMIC) through an interface. The MMIC is configured to enable, based on the configuration of the measurement frame, the transmitter to send the measurement frame. According to the foregoing solution, a related parameter may be configured for the MMIC, to complete sending of the measurement frame.

According to a second aspect, an embodiment of this application provides a signal processing method. The method is applied to a MIMO radar, the MIMO radar includes a transmitter, a receiver, and a processing unit, and the transmitter includes Nt transmit antennas. The method includes the following steps. The receiver receives a first echo signal and a second echo signal that are formed after a measurement frame sent by the transmitter is reflected by one or more targets. The measurement frame includes a first burst, the first echo signal is formed after a chirp signal sent by each of the Nt transmit antennas at a period of $N1*T1$ in the first burst is reflected by the one or more targets, the second echo signal is formed after another chirp signal sent by a first transmit antenna of the Nt transmit antennas is reflected by the one or more targets, $N1>Nt$, and T1 is a duration of each chirp signal in the first burst. The processing unit determines a velocity of the one or more targets based on the first echo signal and the second echo signal.

According to the foregoing solution, the transmit antennas use different densities for sending. Therefore, maximum velocity measurement ranges of the first echo signal and the second echo signal that are obtained based on chirp signals sent by the transmit antennas with different transmission densities are different.

If the first transmit antenna sends N1–Nt chirp signals continuously, a phase difference between receive antennas corresponding to a soft overlapping moment is determined only by a doppler (doppler) phase caused by a velocity of a target. Therefore, a corresponding velocity aliasing coefficient can be directly obtained by matching by using a velocity identifier of the target that is calculated on a transmit antenna with a relatively large transmission density, to resume a maximum velocity measurement range of the MIMO radar to a velocity measurement range of SIMO, and determine the velocity of the target.

If the first transmit antenna transmits N1–Nt chirp signals periodically, because a maximum velocity measurement range of a received echo signal corresponding to a high-density transmit antenna is large, a smaller transmission repetition period may be formed during sending of the high-density transmit antenna, and when a spectrum peak search method is used, a quantity of velocity aliasing coefficients of the received echo signal corresponding to the high-density transmit antenna is less than that of SIMO. The received echo signal corresponding to the high-density transmit antenna is used to assist with target velocity calculation in combination with a received echo signal corresponding to a low-density transmit antenna, so that an aliasing coefficient interval range during angular spectrum peak search can be narrowed, and calculation complexity can be reduced.

In a possible design, that the processing unit determines a velocity of the one or more targets based on echo signals received by the receiver includes: The processing unit determines a first identifier based on the first echo signal. The first identifier is used to indicate a distance measurement value and a velocity measurement value of the one or more targets. The processing unit determines a second identifier based on the second echo signal. The second identifier is used to indicate a distance measurement value and a velocity measurement value of the one or more targets. The processing unit determines the velocity of the one or more targets based on the first identifier and the second identifier. According to the foregoing solution, a velocity aliasing coefficient of the target may be determined based on two groups of identifiers (that is, the first identifier and the second identifier) of the target, to determine the velocity of the target.

In a possible design, the second echo signal is formed after a chirp signal sent by the first transmit antenna at a period of M1*T1 is reflected by the one or more targets, and M1<N1. According to the foregoing solution, high-density transmission may be implemented by periodically sending a chirp signal by using the first transmit antenna.

Further, that the processing unit determines the velocity of the one or more targets based on the first identifier and the second identifier may be specifically implemented in the following manner: The processing unit determines, based on N1, a first aliasing coefficient interval corresponding to the first identifier, and determines, based on M1, a second aliasing coefficient interval corresponding to the second identifier. The processing unit determines, based on the first identifier and the second identifier, an aliasing coefficient subset corresponding to the second aliasing coefficient interval in the first aliasing coefficient interval. The processing unit determines a velocity aliasing coefficient based on the aliasing coefficient subset. The processing unit determines the velocity of the one or more targets based on the velocity aliasing coefficient and the first identifier.

In addition, the method further includes: The receiver receives a third echo signal formed after the measurement frame is reflected by the one or more targets. The third echo signal is formed after a chirp signal sent by the first transmit antenna at a period of M2*T1 in the first burst is reflected by the one or more targets, M2<N1, and M1 and M2 are co-prime. That the processing unit determines a velocity of the one or more targets based on echo signals received by the receiver includes: The processing unit determines the velocity of the one or more targets based on the second echo signal and the third echo signal. According to the foregoing solution, because M1 and M2 are co-prime, velocity resolutions of two groups of identifiers determined based on echo signals formed after two groups of chirp signals sent by the first transmit antenna at high densities are reflected are the same, and a velocity measurement range of the MIMO radar can be expanded by using a Chinese remainder method (staggered algorithm).

In addition, the method further includes: The receiver receives a fourth echo signal and a fifth echo signal that are formed after the measurement frame is reflected by the one or more targets. The measurement frame further includes a second burst, the fourth echo signal is formed after a chirp signal sent by a second transmit antenna of the Nt transmit antennas at a period of M3*T2 in the second burst is reflected by the one or more targets, the fifth echo signal is formed after a chirp signal sent by each of the Nt transmit antennas at a period of N2*T2 in the second burst is reflected by the one or more targets, M3<N2, T2 is a duration of each chirp signal in the second burst, and M3*T2 and M1*T1 are co-prime, or M3 and M1 are co-prime and T1 and T2 are equal. That the processing unit determines a velocity of the one or more targets based on echo signals received by the receiver includes: The processing unit determines the velocity of the one or more targets based on the second echo signal and the fourth echo signal. Because M3*T2 and M1*T1 are co-prime or M3 and M1 are co-prime, velocity resolutions of two groups of identifiers determined respectively based on an echo signal formed after the chirp signal sent by the first transmit antenna at a high density is reflected and an echo signal formed after the chirp signal sent by the second transmit antenna at a high density is reflected are the same, and a velocity measurement range of the MIMO radar can be expanded by using a Chinese remainder method (staggered algorithm).

In a possible design, the method further includes: The receiver receives a sixth echo signal formed after the measurement frame is reflected by the one or more targets. The measurement frame further includes a third burst, the sixth echo signal is formed after a chirp signal sent by each of the Nt transmit antennas at a period of N3*T3 in the third burst is reflected by the one or more targets, T3 is a duration of each chirp signal in the third burst, and N3*T3 and M1*T1 are co-prime, or N3 and M1 are co-prime and T1 and T3 are equal. That the processing unit determines a velocity of the one or more targets based on echo signals received by the receiver includes: The processing unit determines the velocity of the one or more targets based on the second echo signal and the sixth echo signal. Because N3*T3 and M1*T1 are co-prime or N3 and M1 are co-prime, a velocity measurement range of the MIMO radar can be expanded by using a Chinese remainder method (staggered algorithm).

In a possible design, the method further includes: The receiver receives a seventh echo signal formed after the measurement frame is reflected by the one or more targets. The seventh echo signal is formed after a plurality of chirp signals continuously sent by the first transmit antenna within a time of N1*T1 in the first burst are reflected by the one or more targets. That the processing unit determines a velocity of the one or more targets based on echo signals received by the receiver includes: The processing unit determines the velocity of the one or more targets based on the second echo signal and the seventh echo signal. In the foregoing implementation, a phase difference between receive antennas corresponding to two or more adjacent timeslots at a soft overlapping moment is determined only by a doppler (doppler) phase caused by a velocity of a target. Therefore, a corresponding velocity aliasing coefficient can be directly obtained by matching by using a velocity identifier of the target that is calculated on the first transmit antenna with a relatively large transmission density, to determine an aliased velocity of the target within a velocity measurement range of SIMO.

According to a third aspect, an embodiment of this application provides a signal transmission apparatus, including: a transmitter, configured to send a measurement frame. The transmitter includes Nt transmit antennas, the measurement frame is used to measure a velocity of a target, and the measurement frame includes a first burst. In the first burst, each of the Nt transmit antennas is configured to send a chirp (chirp) signal at a period of N1*T1, N1>Nt, and T1 is a duration of each chirp signal in the first burst.

In a possible design, in the first burst, a first transmit antenna of the Nt transmit antennas is further configured to send a chirp signal at a period of M1*T1, and M1<N1.

In a possible design, the first transmit antenna is further configured to send a chirp signal at a period of M2*T1, M2<N1, and M1 and M2 are co-prime.

In a possible design, the measurement frame further includes a second burst. In the second burst, each of the Nt transmit antennas is configured to send a chirp signal at a period of N2*T2, a second transmit antenna of the Nt transmit antennas is further configured to send a chirp signal at a period of M3*T2, M3<N2, T2 is a duration of each chirp signal in the second burst, and M3*T2 and M1*T1 are co-prime, or M3 and M1 are co-prime and T1 and T2 are equal.

In a possible design, the measurement frame further includes a third burst. In the third burst, each of the Nt transmit antennas is configured to send a chirp signal at a period of N3*T3, T3 is a duration of each chirp signal in the third burst, and N3*T3 and M1*T1 are co-prime, or N3 and M1 are co-prime and T1 and T3 are equal.

In a possible design, at least one of the Nt transmit antennas continuously sends two chirp signals in the first burst.

In a possible design, the measurement frame is a frequency modulated continuous wave FMCW.

In a possible design, the apparatus further includes: a processing unit, configured to determine a configuration of the measurement frame, and send the configuration of the measurement frame to a monolithic microwave integrated circuit (MMIC) through an interface. The MMIC is configured to enable, based on the configuration of the measurement frame, the transmitter to send the measurement frame.

According to a fourth aspect, an embodiment of this application provides a signal processing apparatus, including: a receiver, configured to receive a first echo signal and a second echo signal that are formed after a measurement frame sent by a transmitter is reflected by one or more targets, where the measurement frame includes a first burst, the first echo signal is formed after a chirp signal sent by each of Nt transmit antennas included in the transmitter at a period of N1*T1 in the first burst is reflected by the one or more targets, the second echo signal is formed after another chirp signal sent by a first transmit antenna of the Nt transmit antennas is reflected by the one or more targets, N1>Nt, and T1 is a duration of each chirp signal in the first burst; and a processing unit, configured to determine a velocity of the one or more targets based on the first echo signal and the second echo signal.

In a possible design, when determining the velocity of the one or more targets based on echo signals received by the receiver, the processing unit is specifically configured to; determine a first identifier based on the first echo signal, where the first identifier is used to indicate a distance measurement value and a velocity measurement value of the one or more targets; determine a second identifier based on the second echo signal, where the second identifier is used to indicate a distance measurement value and a velocity measurement value of the one or more targets; and determine the velocity of the one or more targets based on the first identifier and the second identifier.

In a possible design, the second echo signal is formed after a chirp signal sent by the first transmit antenna at a period of M1*T1 is reflected by the one or more targets, and M1<N1.

In a possible design, when determining the velocity of the one or more targets based on the first identifier and the second identifier, the processing unit is specifically configured to; determine, based on N1, a first aliasing coefficient interval corresponding to the first identifier, and determine, based on M1, a second aliasing coefficient interval corresponding to the second identifier; determine, based on the first identifier and the second identifier, an aliasing coefficient subset corresponding to the second aliasing coefficient interval in the first aliasing coefficient interval; determine a velocity aliasing coefficient based on the aliasing coefficient subset; and determine the velocity of the one or more targets based on the velocity aliasing coefficient and the first identifier.

In a possible design, the receiver is further configured to: receive a third echo signal formed after the measurement frame is reflected by the one or more targets. The third echo signal is formed after a chirp signal sent by the first transmit antenna at a period of M2*T1 in the first burst is reflected by the one or more targets, M2<N1, and M1 and M2 are co-prime. When determining the velocity of the one or more targets based on echo signals received by the receiver, the processing unit is specifically configured to: determine the velocity of the one or more targets based on the second echo signal and the third echo signal.

In a possible design, the receiver is further configured to: receive a fourth echo signal and a fifth echo signal that are formed after the measurement frame is reflected by the one or more targets. The measurement frame further includes a second burst, the fourth echo signal is formed after a chirp signal sent by a second transmit antenna of the Nt transmit antennas at a period of M3*T2 in the second burst is reflected by the one or more targets, the fifth echo signal is formed after a chirp signal sent by each of the Nt transmit antennas at a period of N2*T2 in the second burst is reflected by the one or more targets, M3<N2, T2 is a duration of each chirp signal in the second burst, and M3*T2 and M1*T1 are co-prime, or M3 and M1 are co-prime and T1 and T2 are equal. When determining the velocity of the one or more targets based on echo signals received by the receiver, the processing unit is specifically configured to: determine the velocity of the one or more targets based on the second echo signal and the fourth echo signal.

In a possible design, the receiver is further configured to: receive a sixth echo signal formed after the measurement frame is reflected by the one or more targets. The measurement frame further includes a third burst, the sixth echo signal is formed after a chirp signal sent by each of the Nt transmit antennas at a period of N3*T3 in the third burst is reflected by the one or more targets, T3 is a duration of each chirp signal in the third burst, and N3*T3 and M1*T1 are co-prime, or N3 and M1 are co-prime and T1 and T3 are equal. When determining the velocity of the one or more targets based on echo signals received by the receiver, the processing unit is specifically configured to: determine the velocity of the one or more targets based on the second echo signal and the sixth echo signal.

In a possible design, the receiver is further configured to: receive a seventh echo signal formed after the measurement frame is reflected by the one or more targets. The seventh echo signal is formed after a plurality of chirp signals continuously sent by the first transmit antenna within a time of N1*T1 in the first burst are reflected by the one or more targets. When determining the velocity of the one or more targets based on echo signals received by the receiver, the processing unit is specifically configured to: determine the velocity of the one or more targets based on the second echo signal and the seventh echo signal.

According to a fifth aspect, an embodiment of this application further provides a radar system, including: a transmitter, where the transmitter includes Nt transmit antennas, the transmitter is configured to send a measurement frame, the measurement frame is used to measure a velocity of a target, and the measurement frame includes a first burst, where in the first burst, each of the Nt transmit antennas is configured to send a chirp signal at a period of N1*T1, N1>Nt, and T1 is a duration of each chirp signal in the first burst; a receiver, configured to receive a first echo signal and a second echo signal that are formed after the measurement frame is reflected by one or more targets, where the measurement frame includes the first burst, the first echo signal is formed after a chirp signal sent by each transmit antenna at a period of N1*T1 in the first burst is reflected by the one or more targets, and the second echo signal is formed after another chirp signal sent by a first transmit antenna is reflected by the one or more targets; and a processing unit, configured to determine a velocity of the one or more targets based on echo signals received by the receiver.

In addition, the transmitter in the radar system is further configured to perform another operation performed by the transmitter in the method provided in the first aspect. The receiver in the radar system is further configured to perform another operation performed by the receiver in the method provided in the second aspect. The processing unit in the radar system is further configured to perform another operation performed by the processing unit in the method provided in the first aspect or the second aspect.

DESCRIPTION OF EMBODIMENTS

Generally, a maximum velocity measurement range of a radar may be expressed as $Vmax=\lambda/4*Tc$, where $\lambda$ is a wavelength for frequency modulation, and Tc is a transmission repetition period of a same antenna. It is assumed that a duration of sending one chirp by a single antenna is Tc_SIMO (which may be referred to as a timeslot). Then, in a TDM MIMO radar, when Nt antennas send Nt chirp signals in a TDM manner, a required time Tc_MIMO meets $Tc\_MIMO \geq Nt*Tc\_SIMO$. Therefore, a relationship between a maximum velocity measurement range Vmax_MIMO when the Nt antennas are configured to send chirp and a maximum velocity measurement range Vmax_SIMO when the single antenna is configured to send chirp may be expressed as $Vmax\_SIMO \geq Nt*Vmax\_MIMO$. It can be learned from the foregoing formula that, in the MIMO radar, due to a larger quantity of transmit antennas, the maximum velocity measurement range is decreased. Moreover, a larger quantity Nt of transmit antennas indicates a more serious problem of decreasing the maximum velocity measurement range.

The radar is an apparatus that measures a velocity by using a doppler effect. Due to motion of a target or the radar, a received signal of the radar has a frequency change or a phase change relative to a transmitted signal. In an FMCW system, a distance between the target and the radar is measured by measuring a frequency of an echo signal within one chirp, and a velocity of the target is measured by using a phase difference between echo signals of a same antenna in different timeslots. Therefore, a dimension corresponding to the velocity is also referred to as a doppler domain, that is, a dimension corresponding to doppler on an RD map.

Radar signals sent on a plurality of antennas in a time division manner cause a higher probability of collision between velocities of targets in the doppler domain, that is, observed values of reflected signals of a plurality of targets in the doppler domain are the same, which affects complexity and accuracy of velocity solution of each target. For example, when a SIMO manner is used for sending, a maximum velocity measurement range is −120 km/h to 120 km/h. When four antennas are used for sending in a TDM MIMO manner, a maximum velocity measurement range is reduced to −30 km/h to 30 km/h. Therefore, compared with sending in the SIMO manner, sending in the TDM MIMO manner has a higher probability of collision between velocities of targets in the doppler domain.

Based on the foregoing problem, embodiments of this application provide a signal transmission method and apparatus, a signal processing method and apparatus, and a radar system, so that a MIMO radar can accurately resume a velocity measurement of a target to a velocity measurement range of a SIMO radar.

The following describes an application scenario of an embodiment of this application.

Figure 1:
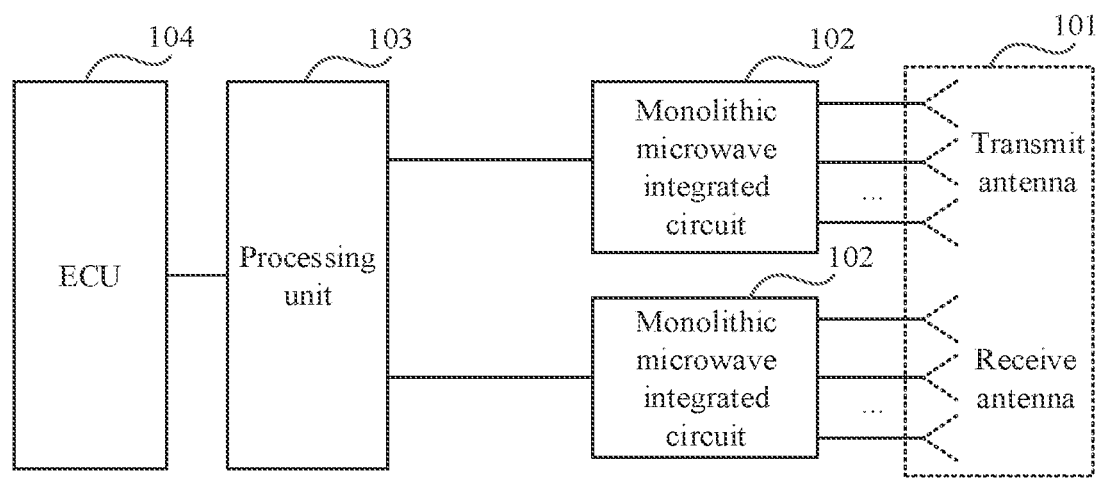
FIG. 1 is a schematic diagram of a structure of a MIMO radar according to an embodiment of this application.

Specifically, in this embodiment of this application, as shown in FIG. 1, a MIMO radar system may include an antenna array 101, a monolithic microwave integrated circuit (monolithic microwave integrated circuit, MMIC) 102, and a processing unit 103. The antenna array 101 may include a plurality of transmit antennas and a plurality of receive antennas.

The monolithic microwave integrated circuit 102 is configured to generate a radar signal, and then send the radar signal by using the antenna array 101. The radar signal includes one or more bursts (bursts), and each burst includes a plurality of chirp signals. After the radar signal is sent, an echo signal is formed after the radar signal is reflected by one or more targets, and the echo signal is received by a receive antenna. The monolithic microwave integrated circuit 102 is further configured to perform processing such as conversion and sampling on the echo signal received by the antenna array 101, and transmit a processed echo signal to the processing unit 103.

The processing unit 103 is configured to perform operations such as fast Fourier transformation (Fast Fourier Transformation, FFT) and signal processing on the echo signal, to determine information such as a distance, a velocity, and an azimuth angle of the target based on the received echo signal. Specifically, the processing unit 103 may be a microprocessor (microcontroller unit, MCU), a central processing unit (central processing unit, CPU), a digital signal processor (digital signal processor, DSP), or a field-programmable gate array (field-programmable gate array, FPGA), or other components with a processing function.

In addition, the radar system shown in FIG. 1 may further include an electronic control unit (electronic control unit, ECU) 104, configured to control a vehicle, for example, determine a vehicle route, based on the distance, the velocity, the azimuth angle, and other information of the target that are obtained by the processing unit 103 after processing.

It should be noted that, in an actual application, one MMIC may be disposed for each of a transmit antenna array and a receive antenna array, or only one MMIC may be disposed for the transmit antenna array and the receive antenna array. The former is shown for illustration in an example of FIG. 1.

In this embodiment of this application, a transmitter may include a transmit antenna and a transmit channel in the monolithic microwave integrated circuit 102, and a receiver may include a receive antenna and a receive channel in the monolithic microwave integrated circuit 102. The transmit antenna and the receive antenna may be located on a printed circuit board (printed circuit board, PCB), and the transmit channel and the receive channel may be located in a chip, that is, AOBs (antennas on PCB). Alternatively, the transmit antenna and the receive antenna may be located in a chip package, and the transmit channel and the receive channel may be located in a chip, that is, AIPs (antennas in package). A combination form is not specifically limited in this embodiment of this application.

It should be understood that specific structures of the transmit channel and the receive channel are not limited in this embodiment of this application, provided that corresponding transmit and receive functions can be implemented.

In addition, it should also be noted that the radar system in this embodiment of this application may be applied to a variety of fields. For example, the radar system in this embodiment of this application includes, but is not limited to, an on-board radar, a roadside traffic radar, and a radar for an unmanned aerial vehicle.

In addition, because a quantity of channels of a single radio frequency chip is limited, when quantities of transmit and receive channels required by the system are greater than those of the single radio frequency chip, a plurality of chips need to be cascaded. Therefore, the entire radar system may include a plurality of cascaded radio frequency chips, which are connected to an analog-to-digital converter (analog digital converter, ADC) channel through interfaces to output data to the processing unit 103 such as an MCU, a DSP, an FPGA, or a general processing unit (General Processing Unit, GPU). In addition, one or more radar systems may be installed on an entire vehicle, and connected to a central processing unit through an on-board bus. The central processing unit controls one or more on-board sensors, including one or more millimeter wave radar sensors.

Figure 2:
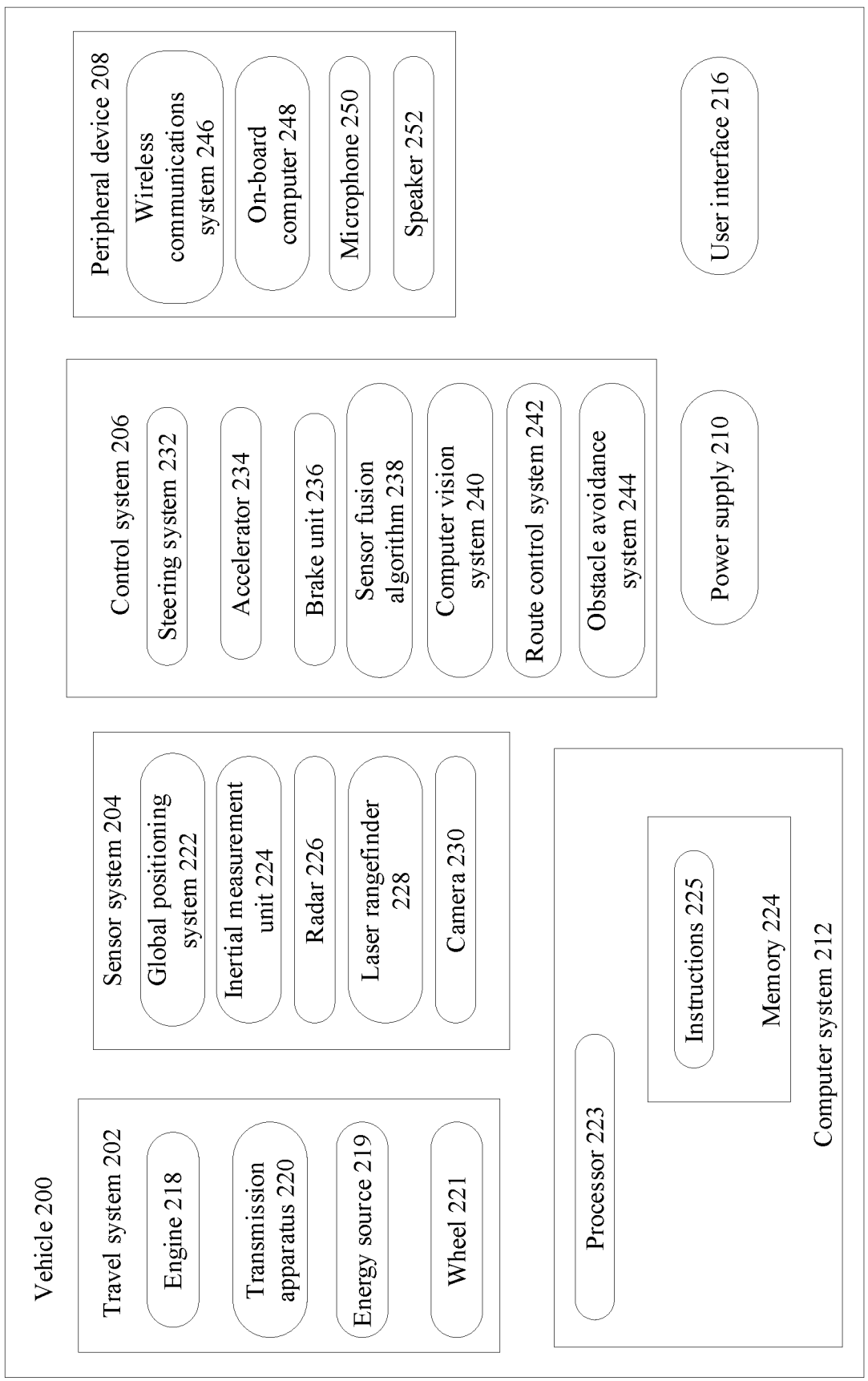
FIG. 2 is a schematic diagram of a structure of a vehicle according to an embodiment of this application.

The MIMO radar system shown in FIG. 1 may be applied to a vehicle with an automated driving function. FIG. 2 is a functional block diagram of a vehicle 200 with an automated driving function according to an embodiment of this application. In an embodiment, the vehicle 200 is configured to be in a fully or partially automated driving mode. For example, when the vehicle 200 is in the autonomous driving mode, the vehicle 200 may control the vehicle, and may determine current statuses of the vehicle and an ambient environment of the vehicle based on human operations, determine possible behavior of at least one another vehicle in the ambient environment, determine a confidence level corresponding to a possibility that the another vehicle performs the possible behavior, and control the vehicle based on the determined information. When the vehicle 200 is in the automated driving mode, the vehicle 200 may be configured to operate without interacting with a person.

The vehicle 200 may include various subsystems, such as a travel system 202, a sensor system 204, a control system 206, one or more peripheral devices 208, a power supply 210, a computer system 212, and a user interface 216. Optionally, the vehicle 200 may include fewer or more subsystems, and each subsystem may include a plurality of elements. In addition, all the subsystems and elements of the vehicle 200 may be wiredly or wirelessly interconnected to each other.

The travel system 202 may include a component that provides power motion for the vehicle 200. In an embodiment, the travel system 202 may include an engine 218, an energy source 219, a transmission apparatus 220, and a wheel/tire 221. The engine 218 may be a an internal combustion engine, an electric motor, an air compression engine, or an engine combination of another type, for example, a hybrid engine including a gasoline engine and an electric motor, or a hybrid engine including an internal combustion engine and an air compression engine. The engine 218 converts the energy source 219 into mechanical energy.

Examples of the energy source 219 include gasoline, diesel, other oil-based fuel, propane, other compressed gas-based fuel, ethanol, solar panels, batteries, and other power sources. The energy source 219 may also provide energy for another system of the vehicle.

The transmission apparatus 220 may transfer mechanical power from the engine 218 to the wheel 221. The transmission apparatus 220 may include a gearbox, a differential, and a drive shaft. In an embodiment, the transmission apparatus 220 may further include another component, for example, a clutch. The drive shaft may include one or more shafts that may be coupled to one or more wheels 221.

The sensor system 204 may include several sensors for sensing information about a surrounding environment of the vehicle 200. For example, the sensor system 204 may include a positioning system 222 (the positioning system may be a global positioning system (global positioning system, GPS) system, or may be a BeiDou system or another positioning system), an inertial measurement unit (inertial measurement unit, IMU) 224, a radar 226, a laser rangefinder 228, and a camera 230. The sensor system 204 may further include sensors (for example, an in-vehicle air quality monitor, a fuel gauge, and an oil temperature gauge) in an internal system of the monitored vehicle 200. Sensor data from one or more of these sensors can be used to detect an object and corresponding features (a location, a shape, a direction, a velocity, and the like) of the object. Such detection and identification are key functions of a safety operation of the autonomous vehicle.

The positioning system 222 may be configured to estimate a geographic position of the vehicle 200. The IMU 224 is configured to sense changes in position and orientation of the vehicle 200 based on inertial acceleration. In an embodiment, the IMU 224 may be a combination of an accelerometer and a gyroscope.

The radar 226 may sense an object within the surrounding environment of the vehicle 200 by using a radio signal. In some embodiments, in addition to sensing the object, the radar 226 may be further configured to sense a velocity and/or a moving direction of the object. In a specific example, the radar 226 may be implemented by using the MIMO radar system shown in FIG. 1.

The laser rangefinder 228 may sense, by using a laser, an object in an environment in which the vehicle is located. In some embodiments, the laser rangefinder 228 may include one or more laser sources, a laser scanner, one or more detectors, and another system component.

The camera 230 may be configured to capture a plurality of images of the surrounding environment of the vehicle 200. The camera 230 may be a static camera or a video camera.

The control system 206 controls operations of the vehicle 200 and components of the vehicle. The control system 206 may include various elements, including a steering system 232, an accelerator 234, a brake unit 236, a sensor fusion algorithm 238, a computer vision system 240, a route control system 242, and an obstacle avoidance system 244.

The steering system 232 may be operated to adjust a heading direction of the vehicle 200. For example, in an embodiment, the steering system may be a steering wheel system.

The accelerator 234 is configured to control an operating velocity of the engine 218 to control a velocity of the vehicle 200.

The brake unit 236 is configured to control the vehicle 200 to decelerate. The brake unit 236 may slow the wheel 221 by using friction. In other embodiments, the brake unit 236 may convert kinetic energy of the wheel 221 into an electric current. The brake unit 236 may alternatively slow a rotational velocity of the wheel 221 by another form to control the velocity of the vehicle 200.

The computer vision system 240 may be operated to process and analyze an image captured by the camera 230, to recognize an object and/or a feature in the surrounding environment of the vehicle 200. The objects and/or features may include traffic signals, road boundaries, and obstacles. The computer vision system 240 may use an object recognition algorithm, a structure from motion (structure from motion, SFM) algorithm, video tracking, and other computer vision technologies. In some embodiments, the computer vision system 240 may be configured to: draw a map for an environment, track an object, estimate an object velocity, and the like.

The route control system 242 is configured to determine a driving route of the vehicle 200. In some embodiments, the route control system 142 may determine a driving route for the vehicle 200 with reference to data from the sensors 238, the GPS 222, and one or more predetermined maps.

The obstacle avoidance system 244 is configured to recognize, evaluate, and avoid or otherwise bypass a potential obstacle in the environment of the vehicle 200.

Certainly, in an example, the control system 206 may add or alternatively include components other than those shown and described, or may reduce some of the components shown above.

The vehicle 200 interacts with an external sensor, another vehicle, another computer system, or a user through the peripheral device 208. The peripheral device 208 may include a wireless communications system 246, an on-board computer 248, a microphone 250, and/or a speaker 252.

In some embodiments, the peripheral device 208 provides means for the user of the vehicle 200 to interact with the user interface 216. For example, the on-board computer 248 may provide information to the user of the vehicle 200. The user interface 216 may further receive user input through the on-board computer 248. The on-board computer 248 may be operated through a touchscreen. In other cases, the peripheral device 208 may provide means for the vehicle 200 to communicate with other devices located in the vehicle. For example, the microphone 250 may receive audio (for example, a voice command or other audio input) from the user of the vehicle 200. Similarly, the speaker 252 may output audio to the user of the vehicle 200.

The wireless communications system 246 may wirelessly communicate with one or more devices directly or through a communications network. For example, the wireless communications system 246 may use 3G cellular communications such as code division multiple access (code division multiple access, CDMA), EVDO, a global system for mobile communications (global system for mobile communications, GSM)/general packet radio service (general packet radio service, GPRS), or 4G cellular communications such as long term evolution (long term evolution, LTE), or 5G cellular communications. The wireless communications system 246 may communicate with a wireless local area network (wireless local area network, WLAN) through Wi-Fi. In some embodiments, the wireless communications system 246 may directly communicate with a device through an infrared link, Bluetooth, or ZigBee. Other wireless protocols, for example, various vehicle communications systems such as the wireless communications system 246, may include one or more dedicated short range communications (dedicated short range communications, DSRC) devices, which may include public and/or private data communications between vehicles and/or roadside stations.

The power supply 210 may provide power to various components of the vehicle 200. In an embodiment, the power supply 210 may be a rechargeable lithium-ion or lead-acid battery. One or more battery packs of such batteries may be configured as the power supply to supply power to the components of the vehicle 200. In some embodiments, the power supply 210 and the energy source 219 may be implemented together, for example, as implemented in some all-electric vehicles.

Some or all functions of the vehicle 200 are controlled by the computer system 212. The computer system 212 may include at least one processor 223. The processor 223 executes instructions 225 stored in a non-transient computer-readable medium such as a memory 224. The computer system 212 may alternatively be a plurality of computing devices that control individual components or subsystems of the vehicle 200 in a distributed manner.

The processor 223 may be any conventional processor, such as a commercially available central processing unit (central processing unit, CPU). Alternatively, the processor may be a dedicated device such as an application-specific integrated circuit (application-specific integrated circuit, ASIC) or other hardware-based processors. FIG. 2 shows a function diagram including a processor, a memory, and other components of the computer system 212 in the same block. A person of ordinary skill in the art should understand that the processor, the computer, or the memory may actually include a plurality of processors, computers, or memories that may or may not be stored in the same physical housing. For example, the memory may be a hard disk drive, or another storage medium located in a housing different from that of the computer system 212. Thus, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In other aspects, some of the processes described herein are performed on the processor disposed inside the vehicle, while others are performed by a remote processor. The processes include necessary steps for performing a single operation.

In some embodiments, the memory 224 may include the instructions 225 (for example, program logic), and the instructions 225 may be executed by the processor 223 to perform various functions of the vehicle 200, including functions described above. The memory 224 may further include additional instructions, including instructions for sending data to, receiving data from, interacting with, and/or controlling one or more of the travel system 202, the sensor system 204, the control system 206, and the peripheral device 208.

In addition to the instructions 225, the memory 224 may further store data such as a road map, route information, a vehicle location, a vehicle direction, a vehicle velocity, and other vehicle data, and other information. Such information may be used by the vehicle 200 and the computer system 212 during operation of the vehicle 200 in an autonomous, semi-autonomous, and/or manual mode.

The user interface 216 is configured to provide information to or receive information from the user of the vehicle 200. Optionally, the user interface 216 may include one or more input/output devices within a set of peripheral devices 208, such as the wireless communications system 246, the on-board computer 248, the microphone 250, and the speaker 252.

The computer system 212 may control a function of the vehicle 200 based on input received from various subsystems (for example, the travel system 202, the sensor system 204, and the control system 206) and the user interface 216. For example, the computer system 212 may control the steering unit 232 by using input from the control system 206, to avoid an obstacle detected by the sensor system 204 and the obstacle avoidance system 244. In some embodiments, the computer system 212 may be operated to provide control over many aspects of the vehicle 200 and subsystems of the vehicle.

Optionally, one or more of the foregoing components may be installed separately from or associated with the vehicle 200. For example, the memory 224 may be partially or fully separated from the vehicle 200. The foregoing components may be communicatively coupled together in a wired and/or wireless manner.

Optionally, the foregoing components are merely examples. In actual application, components in the foregoing modules may be added or deleted depending on actual requirements. FIG. 2 should not be understood as any limitation on the embodiments of this application.

An automated driving vehicle traveling on a road, such as the vehicle 200, may identify objects in the ambient environment of the vehicle to determine to adjust a current velocity. The objects may be the other vehicles, traffic control devices, or objects of other types. In some examples, the automated driving vehicle may independently consider each identified object, and may determine a to-be-adjusted velocity of the automated driving vehicle based on characteristics of the identified object, such as a current velocity of the object, acceleration of the object, and a distance between the object and the vehicle.

Optionally, the automated driving vehicle 200 or a computing device (such as the computer system 212, the computer vision system 240, and the memory 224 in FIG. 2) associated with the automated driving vehicle 200 may predict behavior of the identified object based on the characteristic of the identified object and a status (for example, traffic, rain, or road ice) of the surrounding environment. Optionally, all the identified objects depend on behavior of each other, and therefore all the identified objects may be considered together to predict behavior of a single identified object. The vehicle 200 can adjust the velocity of the vehicle based on the predicted behavior of the identified object. In other words, the automated driving vehicle can determine, based on the predicted behavior of the object, a stable status to which the vehicle needs to be adjusted (for example, acceleration, deceleration, or stop). In this process, another factor may also be considered to determine the velocity of the vehicle 200, for example, a horizontal location of the vehicle 200 on a road on which the vehicle travels, a curvature of the road, and proximity between a static object and a dynamic object.

In addition to providing an instruction for adjusting the velocity of the automated driving vehicle, the computing device may further provide an instruction for modifying a steering angle of the vehicle 200, so that the automated driving vehicle follows a given trajectory and/or maintains safe lateral and longitudinal distances between the automated driving vehicle and an object (for example, a car in an adjacent lane on the road) near the automated driving vehicle.

The vehicle 200 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specially limited in the embodiments of this application.

The following further describes in detail the embodiments of this application with reference to the accompanying drawings.

It should be noted that, in the embodiments of this application, "a plurality of" means two or more. In addition, it should be understood that, in the descriptions of this application, terms such as "first" and "second" are merely used for distinguishing and description, but cannot be understood as indicating or implying relative importance, or indicating or implying an order. Coupling between a velocity and an angle means that when there is only one target, a plurality of false peaks are present on ambiguity functions of the angle and the velocity, affecting determining of the target. The following briefly describes application scenarios of the embodiments of this application.

Figure 3:
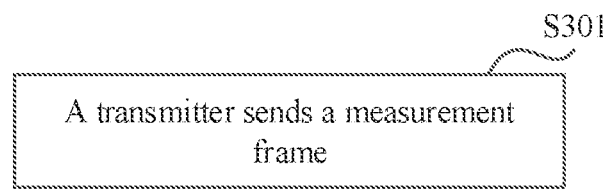
FIG. 3 is a schematic flowchart of a signal transmission method according to an embodiment of this application.

FIG. 3 shows a signal transmission method according to an embodiment of this application. The method is applied to a MIMO radar. The MIMO radar includes a transmitter, and the transmitter includes Nt transmit antennas. Specifically, the method shown in FIG. 3 includes the following step.

S301: The transmitter sends a measurement frame. The measurement frame includes a first burst (burst1), and is used to measure a velocity of a target.

The measurement frame may be a frequency modulated continuous wave (frequency modulated continuous wave, FMCW), or may use another waveform used by an MIMO radar, for example, may be either of a multiple frequency shift keying (multiple frequency-shift keying, MFSK) and a phase modulated continuous wave (phase modulated continuous wave, PMCW). This is not limited in this application. For ease of description, an FMCW waveform is used as an example for description in this embodiment of this application.

In the first burst, each of the Nt transmit antennas is configured to send a chirp (chirp) signal at a period of $N1*T1$, $N1>Nt$, and T1 is a duration of each chirp signal in the first burst. In an actual signal, a duration of each chirp signal includes a sweep time (that is, an effective measurement time) and an idle time (for example, a phase-locked loop stabilization time or an analog-to-digital converter stabilization time).

$N1>Nt$ means as follows: Each transmit antenna sends a chirp signal at the period of $N1*T1$. It is assumed that chirp signals transmitted in one period are referred to as one round of chirp signals. Then, a quantity (N1) of chirp signals in one round is greater than a quantity (Nt) of the transmit antennas. In other words, in one round of chirp signals, in addition to Nt timeslots formed by sending one chirp signal (that is, sending one timeslot) by each transmit antenna, there are N1−Nt timeslots. That is, at least one of the Nt transmit antennas sends a chirp signal in the N1−Nt timeslots. In this embodiment of this application, both a first transmit antenna and a second transmit antenna may be considered as transmit antennas that send a chirp signal in the N1−Nt timeslots.

Because N1−Nt>0, it may be understood that this embodiment of this application introduces a transmission overhead as compared with a conventional MIMO radar (usually N1−Nt=0), and the N1−Nt timeslots may be understood as an additional transmission overhead introduced in this embodiment of this application. In engineering, in order to avoid an excessive overhead, $N1<2*G*Nt$ is recommended, where G is a quantity of integer groups into which the Nt transmit antennas are divided. When G=1, $2*Nt>N1>Nt$. When G≠1, $2*G*Nt>N1>Nt$. When there area relatively small quantity of transmit antennas, for example, when Nt=2, 3, G=1, 2, 3, 4, 5, 6. When there are a relatively large quantity of transmit antennas, for example, when Nt=6 to 12, G=1, 2.

Due to complexity of an on-board environment, resolution requirements on the target in a spatial dimension (a distance, a horizontal azimuth angle, and a vertical azimuth angle) and a velocity dimension may not be the same. Therefore, specific values of the transmit antenna quantity Nt in a burst and the repetition period $N1*T1$ in TDM MIMO may be dynamically configured based on the on-board environment. Generally, an ECU configures parameters such as Nt and $N1*T1$ on a radar module through a common on-board bus, for example, controller area network (controller area network, CAN), controller area network with flexible data-rate (controller area network with flexible data-rate, CAN-FD), general Ethernet (general Ethernet, GE), or other on-board interfaces. The radar module may configure the parameters on an MMIC through a serial peripheral interface (serial peripheral interface, SPI). When a plurality of chips are cascaded, master and slave radio frequency front-end chips may be configured for flexible configuration. The MMIC may be configured to enable the transmitter based on a configuration of the measurement frame to send the measurement frame.

It should be noted that, when the on-board interface configures the parameters on the radar module, the configured parameters are not limited to the foregoing examples, provided that the configured parameters are used to indicate how the transmit antennas send chirp signals. For example, the configured parameters may be specific values of Nt, N1, and T1, or may be equivalent parameters of the specific values of Nt, N1, and T1.

In this embodiment of this application, the burst is a concept of a time segment, and the burst may also be referred to as a timeslot, a subframe, a frame, or the like. In addition, in the description of this application, a timeslot is a minimum time unit, one burst includes at least one timeslot, one subframe includes at least one burst, and one frame includes at least one subframe.

Specifically, the additional transmission overhead (that is, the N1−Nt timeslots) introduced in this embodiment of this application may be one or more timeslots. If the additional transmission overhead is a plurality of timeslots, the first transmit antenna may send N1−Nt chirp signals periodically or aperiodically.

Figure 4:
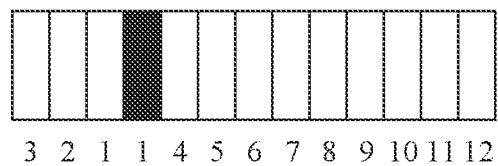
FIG. 4 is a schematic diagram of a chirp signal sent by a first MIMO radar according to an embodiment of this application.

For example, if the additional transmission overhead is one timeslot, in an example of N1=13 and Nt=12, a round of chirp signals sent by the Nt transmit antennas may be shown in FIG. 4. In the example of FIG. 4, a strip represents a chirp signal, and each chirp signal occupies a timeslot. A white filled part may be considered as the chirp signal sent by each transmit antenna at the period of $N1*T1$, and a black filled part may be considered as the N1−Nt chirp signal sent by the first transmit antenna. Particularly, in the example of FIG. 4, the N1−Nt chirp signal sent by the first transmit antenna and a chirp signal sent by the first transmit antenna at the period of $N1*T1$ are two chirp signals (forming soft overlapping) continuous in time. The 12 transmit antennas are numbered 1, 2, 3, . . . , 12, the first transmit antenna is numbered 1, and a chirp signal correspondingly sent by each transmit antenna may be marked in FIG. 4. It can be learned from FIG. 4 that, in a round of chirp signals, the first transmit antenna not only sends a chirp signal in the third timeslot at the period of $N1*T1$, but also sends the N1−Nt chirp signal in the fourth timeslot.

It should be noted that, in the example of FIG. 4, only one round of chirp signals is shown. In an actual application, the transmit antennas may send Ndoppler rounds of chirp signals, to form the first burst. For example, Ndoppler=64, 128.

It should also be noted that, examples of this application are all similar to the example of FIG. 4, where a strip is used to represent a chirp signal, and a shape of the strip is merely an example, but does not represent a waveform of a chirp signal in an actual application. A specific waveform of the chirp signal is not limited in this embodiment of this application.

Figure 5:
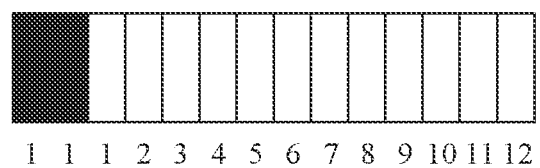
FIG. 5 is a schematic diagram of a chirp signal sent by a second MIMO radar according to an embodiment of this application.

For example, if the additional transmission overhead is a plurality of timeslots, and in a round of chirp signals, N1−Nt chirp signals are sent aperiodically, in an example of N1=14 and Nt=12, a round of chirp signals sent by the Nt transmit antennas may be shown in FIG. 5. A white filled part may be considered as the chirp signal sent by each transmit antenna at the period of N1*T1, and black filled parts may be considered as the N1−Nt chirp signals sent by the first transmit antenna. A chirp signal correspondingly sent by each transmit antenna may be marked in FIG. 5. It can be learned from FIG. 5 that, in a round of chirp signals, the first transmit antenna not only sends a chirp signal in the third timeslot at the period of N1*T1, but also continuously sends the N1−Nt chirp signals in the first timeslot and the second timeslot (the chirp signals sent in the first timeslot, the second timeslot, and the third timeslot form soft overlapping). Similarly, the transmit antennas may transmit Ndoppler rounds of chirp signals shown in FIG. 5, to form the first burst.

Figure 6:
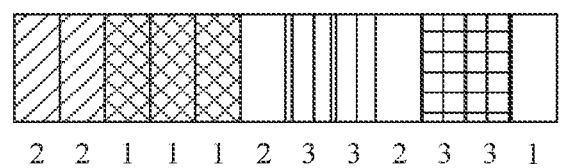
FIG. 6 is a schematic diagram of a chirp signal sent by a third MIMO radar according to an embodiment of this application.

In another example, if the additional transmission overhead is a plurality of timeslots, and in a round of chirp signals, N1−Nt chirp signals are sent aperiodically, in an example of Nt=3 and N1=12, a round of chirp signals sent by the Nt transmit antennas may be shown in FIG. 6. In FIG. 6, each transmit antenna continuously sends a plurality of chirp signals in time.

It should be understood that in the example shown in FIG. 6, N1>Nt, but there is no strictly high-density transmit antenna in the Nt transmit antennas because each transmit antenna transmits a same quantity of signals in a round of chirp signals. This may be considered as a special example in this application. In other words, to make N1>Nt, one or more high-density antennas are generally configured in this embodiment of this application, to send chirp signals in N1−Nt timeslots. However, in some examples, alternatively, each transmit antenna may send a same quantity of chirp signals in one period, without a necessary order. In this manner, N1>Nt may also be implemented.

Figure 7:
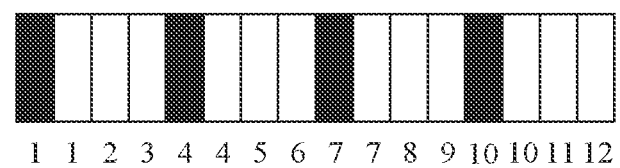
FIG. 7 is a schematic diagram of a chirp signal sent by a fourth MIMO radar according to an embodiment of this application.

In another example, a transmit antenna that performs high-density transmission in a round of chirp signals is not limited to the first transmit antenna. For example, as shown in FIG. 7, in an example of Nt=12 and N1=16, in a round of chirp signals, a transmit antenna numbered 1 sends chirp signals in the first timeslot and the second timeslot, a transmit antenna numbered 4 sends chirp signals in the fifth timeslot and the sixth timeslot, a transmit antenna numbered 7 sends chirp signals in the ninth timeslot and the tenth timeslot, and a transmit antenna numbered 10 transmits chirp signals in the thirteenth timeslot and the fourteenth timeslot. That is, in the example of FIG. 7, four transmit antennas perform high-density transmission.

Certainly, if N1−Nt is greater than one, N1−Nt chirp signals may alternatively be sent periodically. In this case, in the first burst, the first transmit antenna is further configured to send a chirp signal at a period of M1*T1, and M1<N1. That is, in the first burst, each transmit antenna is configured to send a chirp signal at the period of N1*T1, and the first transmit antenna is further configured to send a chirp signal at the period of M1*T1. In a round of chirp signals, a quantity of chirp signals sent by the first transmit antenna at the period of M1*T1 is N1−Nt.

Figure 8:
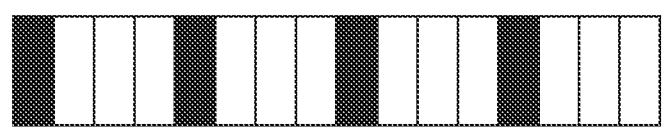
FIG. 8 is a schematic diagram of a chirp signal sent by a fifth MIMO radar according to an embodiment of this application.

For example, if the transmitter includes 12 transmit antennas (Nt=12), N1=16, and M1=4, around of chirp signals transmitted by the 12 transmit antennas may be shown in FIG. 8. In FIG. 8, a black filled part may be considered as a chirp signal sent by the first transmit antenna at the period of M1*T1, and a white filled part may be considered as a chirp signal sent by each transmit antenna at the period of N1*T1. Specifically, in 16 chirp signals shown in FIG. 8, a quantity of chirp signals sent by the first transmit antenna is 4+1=5, and a quantity of chirp signals sent by each of the other 11 transmit antennas is 1. In an actual application, in the first burst, the combination shown in FIG. 8 may be sent Ndoppler times to form the first burst. For example, Ndoppler=128.

Figure 9:
FIG. 9 is a schematic diagram of a chirp signal sent by a sixth MIMO radar according to an embodiment of this application.

For example, if the transmitter includes 12 transmit antennas (Nt=12), N1=15, and M1=5, a round of chirp signals transmitted by the 12 transmit antennas may be shown in FIG. 9. In FIG. 9, a black filled part may be considered as a chirp signal sent by the first transmit antenna at the period of M1*T1, and a white filled part may be considered as a chirp signal sent by each transmit antenna at the period of N1*T1. Specifically, in 15 chirp signals shown in FIG. 9, a quantity of chirp signals sent by the first transmit antenna is 3+1=4, and a quantity of chirp signals sent by each of the other 11 transmit antennas is 1. Similarly, in the first burst, the combination shown in FIG. 9 may be sent Ndoppler times to form the first burst.

It can be learned from the two examples of FIG. 8 and FIG. 9 that, in the first burst, not only each transmit antenna periodically sends a chirp signal, but also a first transmit antenna with a relatively large transmission density additionally sends a chirp signal at a relatively short period. When the Nt transmit antennas send a round of chirp signals, the Nt transmit antennas are divided into Nt/(M1−1) groups, and the Nt transmit antennas send Nt/(M1−1)+Nt chirp signals in one round. For example, in the example of FIG. 8, the 12 transmit antennas are divided into 12/(4−1) groups, and each group includes one chirp signal (black filled part) sent at a high density and three chirp signals (white filled parts) sent at a low density. One round of chirp signals includes 12/(4−1)+12=16 chirp signals.

In addition, in an actual application, considering factors such as a processing delay and power consumption, there is also a duty cycle P % in a measurement frame. For example, under a design constraint that an update period is 20 Hz, each measurement frame cannot be greater than 50 ms. The duration T1 of each chirp signal is 20 μs, Ndoppler=128, Nt=12, and N1=16. Then, a time that is in a measurement frame and that is available for effective measurement is 20*128*16=40.96 ms, and a duty cycle is about 82%.

In the foregoing manner of sending a chirp signal, different densities of sending by the transmit antennas can be implemented. A transmission density of the first transmit antenna is relatively large, and a transmission density of another transmit antenna is relatively small. Because a maximum velocity measurement range of a received echo signal corresponding to a high-density transmit antenna is large, a smaller transmission repetition period may be formed during sending by the high-density transmit antenna, and when a spectrum peak search method is used, a quantity of velocity aliasing coefficients of the received echo signal corresponding to the high-density transmit antenna is less than that of SIMO. The received echo signal corresponding to the high-density transmit antenna is used to assist with target velocity calculation in combination with a received echo signal corresponding to a low-density transmit antenna, so that an aliasing coefficient interval range during angular spectrum peak search can be narrowed, and calculation complexity can be reduced. In addition, in the manner in which soft overlapping is formed by sending a chirp signal at a high density (the examples of FIG. 4 to FIG. 7), because only a velocity of a target is introduced to phases of echo signals that are formed after chirp signals transmitted adjacently in time are reflected and that are received by antennas, an aliasing interval of the velocity of the target may be obtained by calculating a phase difference between the echo signals that are formed after the chirp signals transmitted adjacently are reflected and that are received by the antennas.

In addition, in the first burst, the first transmit antenna is further configured to send a chirp signal at a period of M2*T1, M2<N1, and M1 and M2 are co-prime.

That is, in the first burst, the first transmit antenna has a transmission density greater than that in the foregoing solution. An identifier of one or more targets (that is, a group of identifiers) may be obtained by obtaining an echo signal formed after the chirp signal sent by the first transmit antenna at the period of M1*T1 is reflected by the one or more targets, and detecting the echo signal. An identifier of the one or more targets (that is, a group of identifiers) may be obtained by obtaining an echo signal formed after the chirp signal sent by the first transmit antenna at the period of M2*T1 is reflected by the one or more targets, and detecting the echo signal. Because M1 and M2 are co-prime, a velocity measurement range of the MIMO radar can be expanded by using a Chinese remainder method (staggered algorithm).

In the foregoing solution, not only each transmit antenna sends a chirp signal at the period of N1*T1, but also the first transmit antenna further sends chirp signals at the periods of M1*T1 and M2*T1. Then, in the solution, N1=M1*M2 chirp signals need to be sent when sending a round of chirp signals. M1 timeslots are occupied by a transmit antenna whose transmission density is M2*T1, and M2 timeslots are occupied by a transmit antenna whose transmission density is M1*T1. A timeslot (for example, the first timeslot or the last timeslot) may be shared. Then, remaining M1*M2−M1−M2+1=G*Nt timeslots may be used by the Nt transmit antennas to send chirp signals at the period of N1*T1. For example, M1=3 and M2=7. In this case, there are 3*7−3−7+1=12 timeslots for each transmit antenna to send a chirp signal at the period of N1*T1, and a high-density transmission percentage is about (21−12)/21P42.8%. For another example, M1=5 and M2=7. In this case, there are 5*7−5−7+1=24 timeslots for each transmit antenna to send a chirp signal at the period of N1*T1, and a high-density transmission percentage is about (35−24)/35≈31.4%.

Figure 10:
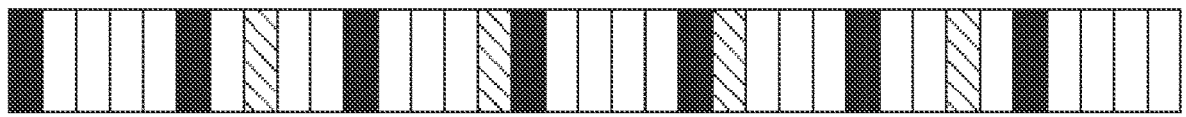
FIG. 10 is a schematic diagram of a chirp signal sent by a seventh MIMO radar according to an embodiment of this application.
Figure 10:

For example, if the transmitter includes 24 transmit antennas, M1=5, M2=7, and N1=35, a round of chirp signals transmitted by the 24 transmit antennas may be shown in an example a of FIG. 10, or may be shown in an example b of FIG. 10. In the examples of FIG. 10, a black filled part may be considered as a chirp signal sent by the first transmit antenna at the period of M1*T1, a stripe filled part may be considered as a chirp signal sent by the first transmit antenna at the period of M2*T1, and a white filled part may be considered as a chirp signal sent by each transmit antenna at the period of N1*T1. Similarly, in the first burst, the combination shown in the example a or the example b of FIG. 10 may be sent Ndoppler times to form the first burst. A difference between the example b and the example a lies in a time offset between a chirp signal sent at a high density in the example b and that in the example a.

According to the foregoing solution, velocity resolutions of two groups of identifiers determined based on echo signals formed after two groups of chirp signals sent by the first transmit antenna at high densities are reflected are the same. Because M1 and M2 are co-prime, and in a staggered algorithm, any two co-prime integer equations have a solution, according to the foregoing solution, a velocity measurement range of the MIMO radar can be expanded by using a Chinese remainder method (staggered algorithm).

Because M1 and M2 are co-prime, and velocity resolutions of two groups of identifiers determined based on echo signals formed after two groups of chirp signals sent by the first transmit antenna at high densities are reflected are the same, a velocity measurement range of the MIMO radar can be expanded by using a Chinese remainder method (staggered algorithm).

Optionally, in this embodiment of this application, the measurement frame may further include a second burst (burst2). In the second burst, each of the Nt transmit antennas is configured to send a chirp signal at a period of N2*T2, a second transmit antenna of the Nt transmit antennas is further configured to send a chirp signal at a period of M3*T2, M3<N2, T2 is a duration of each chirp signal in the second burst, and M3*T2 and M1*T1 are co-prime, or M3 and M1 are co-prime and T1 and T2 are equal.

Similar to the first burst, in a process of sending the second burst, there are also a transmit antenna (the second transmit antenna) with a relatively large transmission density and a transmit antenna (a transmit antenna other than the second transmit antenna) with a relatively small transmission density. The first transmit antenna and the second transmit antenna may be a same transmit antenna, or may be different transmit antennas.

In the foregoing implementation, M3*T2 and M1*T1 are co-prime, or M3 and M1 are co-prime and T1 and T2 are equal. Specifically, if T1 and T2 are not equal, M3*T2 and M1*T1 are co-prime. If T1 and T2 are equal, M3 and M1 are co-prime. For example, if T1=20 μs, T2=21 μs, M1=5, and M3=7, that M3*T2 and M1*T1 are co-prime may be understood as that 20*5 and 21*7 are co-prime. For another example, if T1=T2=10 μs, M1=3, and M3=8, M1 and M3 are co-prime.

According to the foregoing solution, velocity resolutions of two groups of identifiers determined respectively based on an echo signal formed after the chirp signal sent by the first transmit antenna at a high density is reflected and an echo signal formed after the chirp signal sent by the second transmit antenna at a high density is reflected are the same. Because M3*T2 and M1*T1 are co-prime or M3 and M1 are co-prime, and in a staggered algorithm, any two co-prime integer equations have a solution, according to the foregoing solution, a velocity measurement range of the MIMO radar can be expanded by using a Chinese remainder method (staggered algorithm).

Optionally, in this embodiment of this application, the measurement frame may further include a third burst. In the third burst, each of the Nt transmit antennas is configured to send a chirp signal at a period of N3*T3, T3 is a duration of each chirp signal in the third burst, and N3*T3 and M1*T1 are co-prime, or N3 and M1 are co-prime and T3 and T1 are equal.

Apparently, in the third burst, each transmit antenna has a same transmission density.

In addition, in the foregoing implementation, N3*T3 and M1*T1 are co-prime, or N3 and M1 are co-prime and T1 and T3 are equal. Specifically, if T1 and T3 are not equal, N3*T3 and M1*T1 are co-prime. If T1 and T3 are equal, N3 and M1 are co-prime.

According to the foregoing solution, because N3*T3 and M1*T1 are co-prime or N3 and M1 are co-prime, and in a staggered algorithm, any two co-prime integer equations have a solution, according to the foregoing solution, a velocity measurement range of the MIMO radar can be expanded by using a Chinese remainder method (staggered algorithm).

As described above, in the first burst, each of the Nt transmit antennas is configured to send a chirp signal at the period of N1*T1, and the first transmit antenna of the Nt transmit antennas is further configured to send a chirp signal at the period of M1*T1. During a specific implementation, the first transmit antenna may be any one of the Nt transmit antennas included in the transmitter. Then, the first transmit antenna may be a transmit antenna that sends a chirp signal adjacent to the N1–Nt chirp signals. In this case, in the first burst, in a plurality of chirp signals sent by the first transmit antenna within a time of N1*T1, there are two chirp signals that are continuously sent in time.

In this embodiment of this application, in a possible implementation, in the Nt transmit antennas, there is at least one transmit antenna that continuously sends two chirp signals within a time range of N1*T1 in the first burst. For example, in the foregoing example, the first transmit antenna is a transmit antenna that transmits a chirp signal adjacent to the N1–Nt chirp signals. In this case, the first transmit antenna continuously sends two chirp signals in the first burst.

Figure 11:
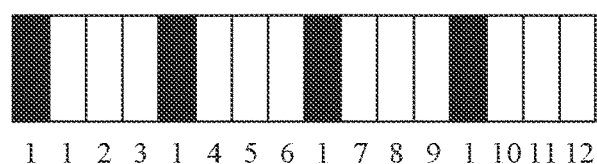
FIG. 11 is a schematic diagram of a chirp signal sent by an eighth MIMO radar according to an embodiment of this application.

That is, a chirp signal adjacent to a chirp signal sent by the first transmit antenna at the period of M1*T1 is a chirp signal sent by the first transmit antenna at the period of N1*T1. It is assumed that the 12 transmit antennas are marked by 1, 2, 3, . . . , 12, and the first transmit antenna is marked by 1. Then, for the example shown in FIG. 8, a chirp signal sent by each transmit antenna may be shown in FIG. 11.

From another perspective, for example, in the first burst, chirp signals sent by the first transmit antenna at the period of M1*T1 occupies three timeslots, and timeslots adjacent to the three timeslots are [2, 5, 7, 10, 12]. Then, when sending a chirp signal at the period of N1*T1, the first transmit antenna may send the chirp signal in any timeslot of [2, 5, 7, 10, 12].

Certainly, in the foregoing several examples, an example in which the first transmit antenna continuously sends two chirp signals is used for description. In an actual application, there may be one or more transmit antennas continuously sending chirp signals in the Nt transmit antennas, and a quantity of continuously sent chirp signals is not limited to two. For example, in the example of FIG. 5, a transmit antenna numbered 1 continuously sends three chirp signals. In the example of FIG. 6, a transmit antenna numbered 2 continuously sends two chirp signals, a transmit antenna numbered 1 continuously sends three chirp signals, and a transmit antenna numbered 3 continuously sends two chirp signals.

A manner in which two transmit antennas at overlapping physical positions send chirp signals in two adjacent timeslots may be referred to as overlapping (overlapping). The foregoing manner in which a same transmit antenna (which may be, for example, the first transmit antenna with a relatively large transmission density) sends chirp signals in two adjacent timeslots may be referred to as soft overlapping in this embodiment of this application, that is, overlapping is implemented in a software manner. In the foregoing implementation, a phase difference between receive antennas corresponding to two or more adjacent timeslots at a soft overlapping moment is determined only by a doppler (doppler) phase caused by a velocity of a target. Therefore, a corresponding velocity aliasing coefficient can be directly obtained by matching by using a velocity identifier of the target that is calculated on the first transmit antenna with a relatively large transmission density, to determine an aliased velocity of the target within a velocity measurement range of SIMO. Herein, there may be a plurality of specific calculation methods. A method may be performing conjugate multiplication on received echo data corresponding to an aliasing coefficient of a soft overlapping pair (two adjacent ones form a pair) after doppler phase compensation and original overlapping signals, performing summation on the plurality of received signals, and finding an aliasing coefficient corresponding to a minimum value of a plurality of aliasing coefficients. Alternatively, a velocity is estimated by directly averaging phase differences of a plurality of soft overlapping pairs.

Apparently, for the cases shown in FIG. 4 to FIG. 7 in which a transmit antenna continuously sends chirp signals in a round of chirp signals, a velocity of a target may also be calculated by using the foregoing soft overlapping manner. It should be noted that the first transmit antenna in this embodiment of this application may not necessarily be a transmit antenna whose physical sequence number is one, and the first transmit antenna may be any one of the Nt transmit antennas.

In conclusion, according to the signal transmission method shown in FIG. 3, different densities of sending by the transmit antennas can be implemented.

If a high-density transmit antenna (which may be, for example, the first transmit antenna) sends N1–Nt chirp signals continuously (such as the examples of FIG. 4 to FIG. 7 and FIG. 11), a phase difference between receive antennas corresponding to a soft overlapping moment is determined only by a doppler (doppler) phase caused by a velocity of a target. Therefore, a corresponding velocity aliasing coefficient can be directly obtained by matching by using a velocity identifier of the target that is calculated on the first transmit antenna with a relatively large transmission density, to determine the velocity of the target.

If a high-density transmit antenna (which may be, for example, the first transmit antenna) sends N1–Nt chirp signals periodically (such as the examples of FIG. 8 to FIG. 10), because a maximum velocity measurement range of a received echo signal corresponding to the high-density transmit antenna is large, a smaller transmission repetition period may be formed during sending of the high-density transmit antenna, and when a spectrum peak search method is used, a quantity of velocity aliasing coefficients of the received echo signal corresponding to the high-density transmit antenna is less than that of SIMO. The received echo signal corresponding to the high-density transmit antenna is used to assist with target velocity calculation in combination with a received echo signal corresponding to a low-density transmit antenna, so that an aliasing coefficient interval range during angular spectrum peak search can be narrowed, and calculation complexity can be reduced.

Therefore, according to the signal transmission method shown in FIG. 3, a maximum velocity measurement range of the MIMO radar can be resumed to a velocity measurement range of the SIMO, without affecting subsequent angle measurement. In an actual application, after the velocity of the target is calculated, further calculation needs to be performed based on data on each receive channel after doppler compensation, to obtain an azimuth angle (for example, including a horizontal azimuth angle and a vertical azimuth angle) of the target, so as to obtain distance, velocity, and angle information of the target. Therefore, accuracy of velocity calculation greatly affects azimuth angle calculation. According to the method provided in this embodiment of this application, accuracy of the azimuth angle calculation can be ensured, and an angular resolution can be improved.

Corresponding to the signal transmission method shown in FIG. 3, an embodiment of this application further provides a signal processing method, to process an echo signal formed after a transmitted measurement frame is reflected by one or more targets, so as to obtain a velocity of the one or more targets, and obtain an azimuth angle (for example, a horizontal azimuth angle and a vertical azimuth angle) of the one or more targets.

Figure 12:
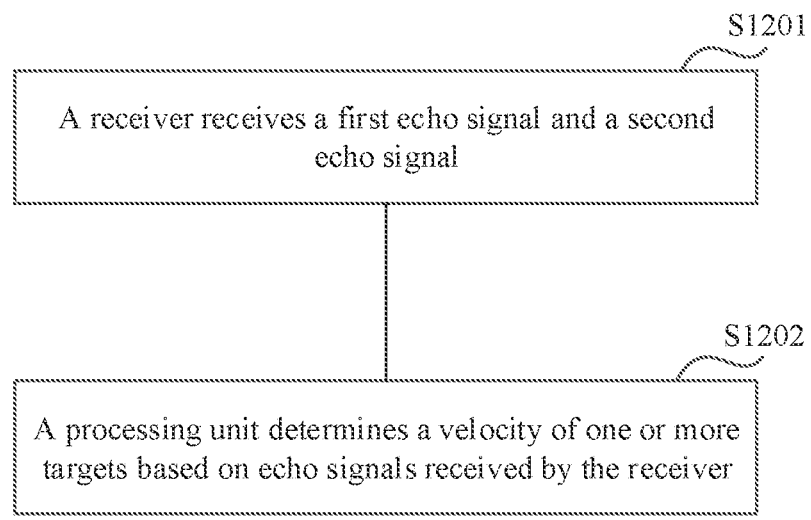
FIG. 12 is a schematic flowchart of a signal processing method according to an embodiment of this application.

The method is applied to a MIMO radar, the MIMO radar includes a transmitter, a receiver, and a processing unit, the transmitter includes Nt transmit antennas, and the receiver includes Nr receive antennas. As shown in FIG. 12, the method includes the following steps.

S1201: The receiver receives a first echo signal and a second echo signal that are formed after a measurement frame sent by the transmitter is reflected by one or more targets.

The measurement frame includes a first burst, the first echo signal is formed after a chirp signal sent by each of the Nt transmit antennas at a period of N1*T1 in the first burst is reflected by the one or more targets, and the second echo signal is formed after another chirp signal sent by a first transmit antenna of the Nt transmit antennas is reflected by the one or more targets.

N1>Nt, and T1 is a duration of each chirp signal in the first burst.

In S1201, the echo signals received by the receiver are echo signals formed after the measurement frame sent by the transmitter in the method shown in FIG. 3 is reflected by the one or more targets. Specifically, the first echo signal is formed after the chirp signal sent by each transmit antenna at the period of N1*T1 in the first burst is reflected by the one or more targets, and the second echo signal is formed after the another chirp signal sent by the first transmit antenna is reflected by the one or more targets.

It should be noted that, in this embodiment of this application, the receiver includes Nr receive antennas, and the Nr receive antennas receive Nt echo signals based on a transmission order of the Nt transmit antennas. Then, the received echo signals are converted into the first echo signal and the second echo signal based on a position relationship between the Nt transmit antennas and the Nr receive antennas and the transmission order of the transmit antennas.

S1202: The processing unit determines a velocity of the one or more targets based on echo signals received by the receiver.

Specifically, in S1202, that the processing unit determines a velocity of the one or more targets based on echo signals received by the receiver may be implemented in the following manner: The processing unit determines a first identifier based on the first echo signal. The first identifier is used to indicate a distance measurement value and a velocity measurement value of the one or more targets. The processing unit determines a second identifier based on the second echo signal. The second identifier is used to indicate a distance measurement value and a velocity measurement value of the one or more targets. The processing unit determines the velocity of the one or more targets based on the first identifier and the second identifier.

The first identifier may include a first velocity identifier and a first distance identifier, and the second identifier may include a second velocity identifier and a second distance identifier. After the first echo signal is obtained, a range doppler map (range doppler map, RD Map) may be obtained by performing operations such as one-dimensional FFT (1D-FFT), two-dimensional FFT (2D-FFT), and coherent combining/non-coherent combining, and then a first velocity identifier (Vind_d) and a first distance identifier (Rind_d) within a maximum velocity measurement range are obtained through detection based on the RD map. Similarly, after the second echo signal is obtained, another RD map may be obtained by performing operations such as 1D-FFT, 2D-FFT, and coherent combining/non-coherent combining, and then a second velocity identifier (Vind_p) and a second distance identifier (Rind_p) within a maximum velocity measurement range are obtained through detection based on the RD map. The maximum velocity measurement range corresponding to the first identifier is less than the maximum velocity measurement range corresponding to the second identifier.

Specifically, when detection is performed based on the RD map, there may be a plurality of detection methods, including but not limited to, common detection methods such as ordered statistic-constant false alarm rate (ordered statistic-constant false alarm rate, OS-CFAR) detection or cell averaging-constant false alarm rate (cell-averaging constant false alarm rate, CA-CFAR) detection. This is not specifically limited in this embodiment of this application.

In an angular spectrum peak search method, received signals corresponding to transmit antennas in different timeslots are respectively supplemented with different aliasing coefficients, and $N_{m\_AOA}$ angles are obtained by searching within a field of view (field of view, FOV) range through FFT or digital beamforming (digital beamforming, DBF). Then, maximum values (angular spectrum peaks) of the different aliasing coefficients in a spectrum of the $N_{m\_AOA}$ angles within the FOV are obtained, and an element in N1 aliasing coefficients that corresponds to a maximum value of the angular spectrum peaks is used as a velocity aliasing coefficient.

During a specific implementation, due to different arrangement orders of chirp signals in the measurement frame transmitted by the Nt transmit antennas, such as different examples shown in FIG. 4 to FIG. 9, manners of determining, by the processing unit, the velocity of the one or more targets based on the first identifier and the second identifier are also different.

Different manners of determining the velocity of the one or more targets are described below.

Manner 1

In Manner 1, the second echo signal is formed after a chirp signal sent by the first transmit antenna at a period of M1*T1 is reflected by the one or more targets, and M1<N1.

That is, in Manner 1, each of the Nt transmit antennas sends a chirp signal at the period of N1*T1, and the first transmit antenna further sends a chirp signal at the period of M1*T1. For a specific example, refer to FIG. 8 or FIG. 9. After the Nr receive antennas receive the measurement frame including a plurality of chirp signals, received echo signals are converted into the first echo signal and the second echo signal based on a position relationship between the Nt transmit antennas and the Nr receive antennas and a transmission order of the transmit antennas.

Then, that the processing unit determines the velocity of the one or more targets based on the first identifier and the second identifier may be specifically implemented in the following manner: The processing unit determines, based on N1, a first aliasing coefficient interval corresponding to the first identifier, and determines, based on M1, a second aliasing coefficient interval corresponding to the second identifier. The processing unit determines, based on the first identifier and the second identifier, an aliasing coefficient subset corresponding to the second aliasing coefficient interval in the first aliasing coefficient interval. The processing unit determines a velocity aliasing coefficient based on the aliasing coefficient subset. The processing unit determines the velocity of the one or more targets based on the velocity aliasing coefficient and the first identifier.

If N1 is an even number, the first aliasing coefficient interval is [−N1/2, N1/2−1]. If N1 is an odd number, the first aliasing coefficient interval is [−(N1−1)/2, (N1−1)/2]. If M1 is an even number, the second aliasing coefficient interval is [−M1/2, M1/2−1]. If M1 is an odd number, the second aliasing coefficient interval is [−(M1−1)/2, (M1−1)/2]. Apparently, because M1<N1, a range of the first aliasing coefficient interval is greater than a range of the second aliasing coefficient interval.

For example, M1=4 and N1=16. In this case, the first aliasing coefficient interval is [−8, −7, −6, −5, −4, −3, −2, −1, 0, 1, 2, 3, 4, 5, 6, 7], and the second aliasing coefficient interval is [−2, −1, 0, 1].

For example, M1=5 and N1=15. In this case, the first aliasing coefficient interval is [−7, −6, −5, −4, −3, −2, −1, 0, 1, 2, 3, 4, 5, 6, 7], and the second aliasing coefficient interval is [−2, −1, 0, 1, 2].

When calculating the velocity of the target, a velocity identifier in the first identifier or the second identifier obtained by using the RD map may be considered as a remainder, data in the aliasing coefficient interval may be considered as a quotient, and the quotient is multiplied by a divisor (a maximum velocity measurement range), and then added to the velocity identifier, to obtain the velocity of the target.

After the first identifier, the second identifier, the first aliasing coefficient interval, and the second aliasing coefficient interval are obtained, the following problem still exists in solving the velocity of the target: Because the second identifier is determined based on the chirp signal sent by the first transmit antenna with a relatively large transmission density, in the second velocity identifier, a probability that a plurality of targets collide is relatively low. However, because the range of the second aliasing coefficient interval is less than the range of the first aliasing coefficient interval, if to resume a velocity measurement range of the MIMO radar to a velocity measurement range of SIMO, the second aliasing coefficient interval further needs to be converted to the first aliasing coefficient interval, and then the velocity of the one or more targets is calculated by using the first identifier and an aliasing coefficient obtained after the conversion.

For example, the first aliasing coefficient interval is [−7, −6, −5, −4, −3, −2, −1,0, 1, 2, 3, 4, 5, 6, 7], and the second aliasing coefficient interval is [−2, −1, 0, 1, 2]. The converting the second aliasing coefficient interval to the first aliasing coefficient interval is finding, in [−7, −6, −5, −4, −3, −2, −1,0, 1, 2, 3, 4, 5, 6, 7], an aliasing coefficient subset corresponding to [−2, −1, 0, 1, 2]. Specifically, because the range of the first aliasing coefficient interval is three times the range of the second aliasing coefficient interval, the aliasing coefficient subset may have three combinations [−7, −4, −1, 2, 5], [−6, −3, 0, 3, 6], and [−5, −2, 1, 4, 7]. Which one of the three combinations is an aliasing coefficient subset S may be determined based on the first identifier and the second identifier. The aliasing coefficient subset S may be considered as a subset of the first aliasing coefficient interval.

Specifically, distance identifiers in the first identifier and the second identifier are not ambiguous, that is, for a same target, a first distance identifier and a second distance identifier should be approximately equal. Then, a first velocity identifier and a second velocity identifier respectively corresponding to the two approximately equal distance identifiers may be used to determine a value that is in the first aliasing coefficient interval and that corresponds to a value in the second aliasing coefficient interval, to determine, based on the correspondence, which one of the three combinations is the aliasing coefficient subset.

For example, M1=4 and N1=16. In this case, the first aliasing coefficient interval is [−8, −7, −6, −5, −4, −3, −2, −1, 0, 1, 2, 3, 4, 5, 6, 7], and the second aliasing coefficient interval is [−2, −1, 0, 1]. Then, a velocity measurement range of a high-density antenna may correspond to four intervals of a velocity measurement range of a low-density antenna. A doppler fft value range corresponding to the high-density antenna also corresponds to four times an fft value range of the low-density antenna. Therefore, when an aliasing coefficient of the high-density antenna is 0, it corresponds to a value in SS=[0, 1, 2, 3] of the low-density antenna. The value corresponding to the alias coefficient 0 of the high-density antenna within the value range of 0, 1, 2, and 3 may be obtained by dividing a velocity identifier Vind_p measured on the high-density antenna by a maximum value of velocity identifiers measured on low-density antennas, and rounding down a quotient of the two, that is, floor(Vind_p/Vind_d_max). It is assumed that floor(Vind_p/Vind_d_max)=1, and SS(1)=1, that is, 1 in the first aliasing coefficient interval corresponds to 0 in the second aliasing coefficient interval. In the first aliasing coefficient interval, one value is obtained every four values to obtain [−7, −3, 1, 5], and [−7, −3, 1, 5] is the aliasing coefficient subset S. It should be noted that a subscript of an SS vector herein starts from 0.

Specifically, M1=5 and N1=15. In this case, the first aliasing coefficient interval is [−7, −6, −5, −4, −3, −2, −1, 0, 1, 2, 3, 4, 5, 6, 7], and the second aliasing coefficient interval is [−1, 0, 1]. Then, a velocity measurement range of a high-density antenna may correspond to three intervals of a velocity measurement range of a low-density antenna. A doppler fft value range corresponding to the high-density antenna also corresponds to three times an fft value range of the low-density antenna. Therefore, when an aliasing coefficient of the high-density antenna is 0, it corresponds to a value in SS=[−1, 0, 1] of the low-density antenna. The value corresponding to the alias coefficient 0 of the high-density antenna within the value range of −1, 0, 1 may be obtained by dividing a velocity identifier Vind_p measured on the high-density antenna by a maximum value of velocity identifiers measured on low-density antennas, and rounding down a quotient of the two, that is, floor(Vind_p/Vind_d_max). It is assumed that floor(Vind_p/Vind_d_max)=1, and SS(1)=1, that is, 1 in the first aliasing coefficient interval corresponds to 0 in the second aliasing coefficient interval. In the first aliasing coefficient interval, one value is obtained every three values to obtain [−6, −3, 0, 3, 6], and [−6, −3, 0, 3, 6] is the aliasing coefficient subset S.

In addition, after the RD map is obtained by performing the foregoing solution, compensation may be further performed on echo signals received by receive antennas. If a processing gain of the chirp signal sent by the first transmit antenna in the first burst is less than a processing gain of the chirp signal sent by each transmit antenna in the first burst at the period of N1*T1, doppler phase compensation may be performed on echo signals by using the first velocity identifier. If a processing gain of the chirp signal sent by the first transmit antenna in the first burst is greater than a processing gain of the chirp signal sent by each transmit antenna in the first burst at the period of N1*T1, doppler phase compensation may be performed on echo signals by using the second velocity identifier.

For example, the following formula may be obtained based on a phase of an echo signal of a receive antenna corresponding to a transmit antenna in each timeslot:

$$S_{TX}^m(f_D^{SIMO}) = S_{TX}^m(f_D^{MIMO})*e^{-i2\pi\frac{a_{coef}*m}{N1}}, m \in [0, N1-1]$$

$$a_{coef} \in \begin{cases} \left[-\frac{M-1}{2}, \frac{M-1}{2}\right], & M \text{ is an odd number} \\ \left[-\frac{M}{2}, \frac{M}{2}-1\right], & M \text{ is an even number} \end{cases}$$

$S_{TX}^m(f_D^{MIMO})$ corresponds to a phase of echo signals of the Nr receive antennas corresponding to a transmit antenna in an $m^{th}$ timeslot when a MIMO transmission period is N1*T1. $S_{TX}^m(f_D^{MIMO})$ corresponds to a phase of Nr corresponding received echo signals when m antennas all transmit a chirp signal in a first timeslot when a SIMO transmission period is T1, $f_D^{SIMO}$ is a doppler frequency that is observed on the RD map and that corresponds to the velocity of the target within the maximum velocity measurement range of the TDM MIMO, and $f_D^{SIMO}$ is a doppler frequency corresponding to the velocity of the target within a to-be-resumed maximum velocity measurement range of the SIMO. In addition, apparently, a value range of $a_{coef}$ is the first aliasing coefficient interval. However, in an actual application of this embodiment of this application, $a_{coef}$ may only need to be an element in the aliasing coefficient subset.

$$e^{-i2\pi\frac{a_{coef}*m}{N1}}$$

is a phase compensation value of echo signals of the Nr receive antennas corresponding to transmit antennas in m timeslots.

After the aliasing coefficient subset is determined, values, on different angular spectra, of received signals of subarrays corresponding to different elements in the aliasing coefficient subset S may be calculated, and an element that is in the aliasing coefficient subset S and that corresponds to a maximum value of the angular spectra is used as the velocity aliasing coefficient. Then, the velocity of the one or more targets may be determined based on the velocity aliasing coefficient, the maximum velocity measurement range, and the first velocity identifier. For a specific manner of determining the velocity aliasing coefficient based on the aliasing coefficient subset, refer to descriptions in a conventional technology. Details are not described herein.

Manner 2

In Manner 2, the receiver further receives a third echo signal formed after the measurement frame is reflected by the one or more targets. The third echo signal is formed after a chirp signal sent by the first transmit antenna at a period of M2*T1 in the first burst is reflected by the one or more targets, M2<N1, and M1 and M2 are co-prime. Then, that the processing unit determines a velocity of the one or more targets based on echo signals received by the receiver may be specifically implemented in the following manner: The processing unit determines the velocity of the one or more targets based on the second echo signal and the third echo signal.

That is, in Manner 2, each of the Nt transmit antennas sends a chirp signal at the period of N1*T1, and the first transmit antenna further sends a chirp signal at the period of M1*T1 and sends a chirp signal at the period of M2*T1. For a specific example, refer to FIG. 10. After the Nr receive antennas receive the measurement frame including a plurality of chirp signals, received echo signals are converted into the first echo signal, the second echo signal, and the third echo signal based on a position relationship between the Nt transmit antennas and the Nr receive antennas and a transmission order of the transmit antennas.

Because M1 and M2 are co-prime, velocity resolutions of velocity identifiers determined based on the second echo signal and the third echo signal are the same, and a velocity aliasing coefficient may be directly determined based on two aliasing coefficient intervals determined by the second echo signal and the third echo signal.

Other operations in Manner 2 are similar to those in Manner 1, and details are not described herein again.

Manner 3

In Manner 3, the receiver further receives a fourth echo signal and a fifth echo signal that are formed after the measurement frame is reflected by the one or more targets. The measurement frame further includes a second burst, the fourth echo signal is formed after a chirp signal sent by a second transmit antenna of the Nt transmit antennas at a period of M3*T2 in the second burst is reflected by the one or more targets, the fifth echo signal is formed after a chirp signal sent by each of the Nt transmit antennas at a period of N2*T2 in the second burst is reflected by the one or more targets, M3<N2, T2 is a duration of each chirp signal in the second burst, and M3*T2 and M1*T1 are co-prime, or M3 and M1 are co-prime and T1 and T2 are equal. Then, that the processing unit determines a velocity of the one or more targets based on echo signals received by the receiver may be specifically implemented in the following manner: The processing unit determines the velocity of the one or more targets based on the second echo signal and the fourth echo signal.

In Manner 3, M3*T2 and M1*T1 are co-prime, or M3 and M1 are co-prime and T1 and T2 are equal, a manner in which the processing unit determines the velocity of the one or more targets based on the second echo signal and the fourth echo signal is the same as the manner in which the processing unit determines the velocity of the one or more targets based on the second echo signal and the third echo signal in Manner 2, and details are not described herein again.

Manner 4

In Manner 4, the receiver further receives a sixth echo signal formed after the measurement frame is reflected by the one or more targets. The measurement frame further includes a third burst, the sixth echo signal is formed after a chirp signal sent by each of the Nt transmit antennas at a period of N3*T3 in the third burst is reflected by the one or more targets, T3 is a duration of each chirp signal in the third burst, and N3*T3 and M1*T1 are co-prime, or N3 and M1 are co-prime and T1 and T3 are equal. Then, that the processing unit determines a velocity of the one or more targets based on echo signals received by the receiver may be specifically implemented in the following manner: The processing unit determines the velocity of the one or more targets based on the second echo signal and the sixth echo signal.

In Manner 4, N3*T3 and M1*T1 are co-prime, or N3 and M1 are co-prime and T1 and T3 are equal, a manner in which the processing unit determines the velocity of the one or more targets based on the second echo signal and the sixth echo signal is the same as the manner in which the processing unit determines the velocity of the one or more targets based on the second echo signal and the third echo signal in Manner 2, and details are not described herein again.

Manner 5

In Manner 5, the receiver further receives a seventh echo signal formed after the measurement frame is reflected by the one or more targets. The seventh echo signal is formed after a plurality of chirp signals continuously sent by the first transmit antenna within a time of N1*T1 in the first burst are reflected by the one or more targets. For a specific implementation, refer to the example of FIG. 4, FIG. 5, or FIG. 9. Then, that the processing unit determines a velocity of the one or more targets based on echo signals received by the receiver may be specifically implemented in the following manner: The processing unit determines the velocity of the one or more targets based on the second echo signal and the seventh echo signal.

As described above, a manner in which two transmit antennas at overlapping physical positions send chirp signals in two adjacent timeslots may be referred to as overlapping. The foregoing manner in which a same transmit antenna sends chirp signals in two adjacent timeslots may be referred to as soft overlapping in this embodiment of this application, that is, overlapping is implemented in a software manner. In Manner 5, a phase difference between receive antennas corresponding to a soft overlapping moment is determined only by a doppler (doppler) phase caused by a velocity of a target. Therefore, a corresponding velocity aliasing coefficient can be directly obtained by matching by using a velocity identifier of the target that is calculated on the first transmit antenna with a relatively large transmission density, to determine the velocity of the target. That is, in Manner 5, a velocity aliasing coefficient may not be determined by calculating an aliasing coefficient subset, but may be directly obtained by matching based on echo signals formed after the plurality of chirp signals continuously sent by the first transmit antenna are reflected. A manner of determining a velocity of a target by overlapping is a conventional technology, and details are not described herein.

In conclusion, according to the signal processing method shown in FIG. 12, the transmit antennas use different densities for sending. Therefore, maximum velocity measurement ranges of the first echo signal and the second echo signal that are obtained based on chirp signals sent by the transmit antennas with different transmission densities are different.

If the first transmit antenna sends N1–Nt chirp signals continuously (such as the examples of FIG. 4 to FIG. 7 and FIG. 11), a phase difference between receive antennas corresponding to a soft overlapping moment is determined only by a doppler (doppler) phase caused by a velocity of a target. Therefore, a corresponding velocity aliasing coefficient can be directly obtained by matching by using a velocity identifier of the target that is calculated on a transmit antenna with a relatively large transmission density, to resume a maximum velocity measurement range of the MIMO radar to a velocity measurement range of SIMO, and determine the velocity of the target.

If the first transmit antenna sends N1–Nt chirp signals periodically (such as the examples of FIG. 8 to FIG. 10), because a maximum velocity measurement range of a received echo signal corresponding to a high-density transmit antenna is large, a smaller transmission repetition period may be formed during sending of the high-density transmit antenna, and when a spectrum peak search method is used, a quantity of velocity aliasing coefficients of the received echo signal corresponding to the high-density transmit antenna is less than that of SIMO. The received echo signal corresponding to the high-density transmit antenna is used to assist with target velocity calculation in combination with a received echo signal corresponding to a low-density transmit antenna, so that an aliasing coefficient interval range during angular spectrum peak search can be narrowed, and calculation complexity can be reduced.

Figure 13:
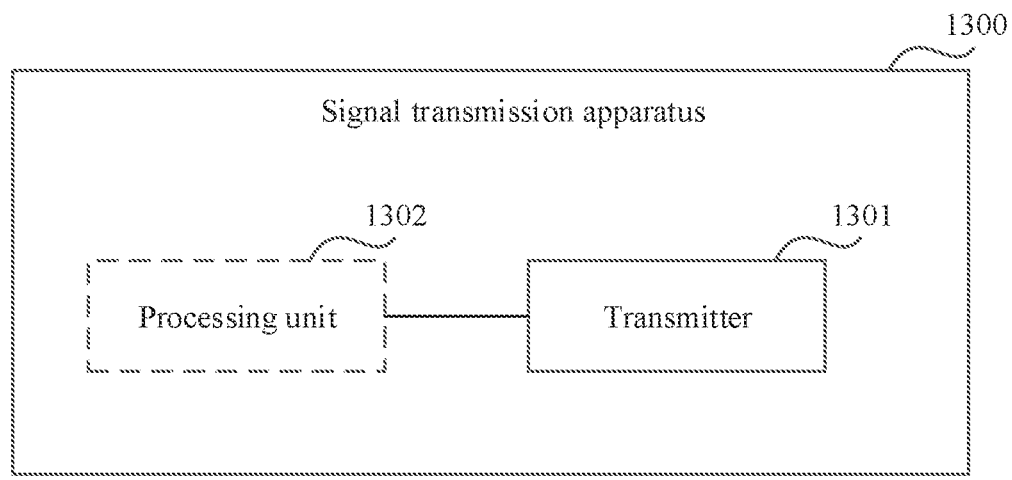
FIG. 13 is a schematic diagram of a structure of a signal transmission apparatus according to an embodiment of this application.

An embodiment of this application further provides a signal transmission apparatus. The apparatus may be configured to perform the signal transmission method shown in FIG. 3. Referring to FIG. 13, the signal transmission apparatus 1300 includes: a transmitter 1301, configured to send a measurement frame. The transmitter 1301 includes Nt transmit antennas, the measurement frame is used to measure a velocity of a target, and the measurement frame includes a first burst. In the first burst, each of the Nt transmit antennas is configured to send a chirp chirp signal at a period of N1*T1, N1>Nt, and T1 is a duration of each chirp signal in the first burst.

In a possible design, in the first burst, a first transmit antenna of the Nt transmit antennas is further configured to send a chirp signal at a period of M1*T1, and M1<N1.

In a possible design, the first transmit antenna is further configured to send a chirp signal at a period of M2*T1, M2<N1, and M1 and M2 are co-prime.

In a possible design, the measurement frame further includes a second burst. In the second burst, each of the Nt transmit antennas is configured to send a chirp signal at a period of N2*T2, a second transmit antenna of the Nt transmit antennas is further configured to send a chirp signal at a period of M3*T2, M3<N2, T2 is a duration of each chirp signal in the second burst, and M3*T2 and M1*T1 are co-prime, or M3 and M1 are co-prime and T1 and T2 are equal.

In a possible design, the measurement frame further includes a third burst. In the third burst, each of the Nt transmit antennas is configured to send a chirp signal at a period of N3*T3, T3 is a duration of each chirp signal in the third burst, and N3*T3 and M1*T1 are co-prime, or N3 and M1 are co-prime and T1 and T3 are equal.

In a possible design, at least one of the Nt transmit antennas continuously sends two chirp signals in the first burst.

In a possible design, the measurement frame is an FMCW.

In a possible design, the apparatus 1300 further includes: a processing unit 1302, configured to determine a configuration of the measurement frame, and send the configuration of the measurement frame to an MMIC through an interface. The MMIC is configured to enable, based on the configuration of the measurement frame, the transmitter to send the measurement frame.

It should be noted that, the signal transmission apparatus 1300 shown in FIG. 13 may be configured to perform the signal transmission method shown in FIG. 3. For an implementation that is not described in detail in the signal transmission apparatus 1300, refer to related descriptions in the signal transmission method shown in FIG. 3.

Figure 14:
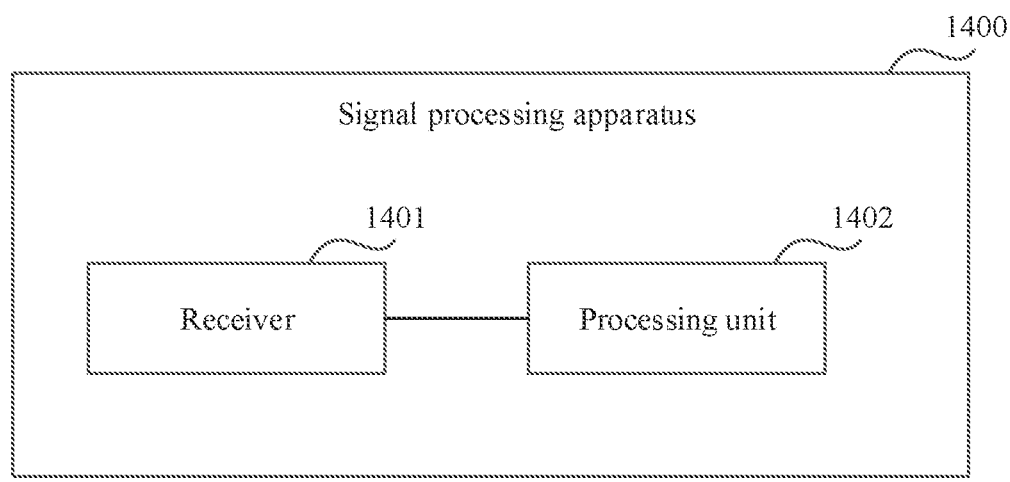
FIG. 14 is a schematic diagram of a structure of a signal processing apparatus according to an embodiment of this application.

An embodiment of this application further provides a signal processing apparatus. The apparatus may be configured to perform the signal processing method shown in FIG. 12. Referring to FIG. 14, the signal processing apparatus 1400 includes: a receiver 1401, configured to receive a first echo signal and a second echo signal that are formed after a measurement frame sent by the transmitter is reflected by one or more targets, where the measurement frame includes a first burst, the first echo signal is formed after a chirp signal sent by each of Nt transmit antennas included in the transmitter at a period of N1*T1 in the first burst is reflected by the one or more targets, the second echo signal is formed after another chirp signal sent by a first transmit antenna of the Nt transmit antennas is reflected by the one or more targets, N1>Nt, and T1 is a duration of each chirp signal in the first burst; and a processing unit 1402, configured to determine a velocity of the one or more targets based on echo signals received by the receiver 1401.

In a possible design, when determining the velocity of the one or more targets based on echo signals received by the receiver 1401, the processing unit 1402 is specifically configured to: determine a first identifier based on the first echo signal, where the first identifier is used to indicate a distance measurement value and a velocity measurement value of the one or more targets; determine a second identifier based on the second echo signal, where the second identifier is used to indicate a distance measurement value and a velocity measurement value of the one or more targets; and determine the velocity of the one or more targets based on the first identifier and the second identifier.

In a possible design, the second echo signal is formed after a chirp signal sent by the first transmit antenna at a period of M1*T1 is reflected by the one or more targets, and M1<N1.

In a possible design, when determining the velocity of the one or more targets based on the first identifier and the second identifier, the processing unit 1402 is specifically configured to: determine, based on N1, a first aliasing coefficient interval corresponding to the first identifier, and determine, based on M1, a second aliasing coefficient interval corresponding to the second identifier; determine, based on the first identifier and the second identifier, an aliasing coefficient subset corresponding to the second aliasing coefficient interval in the first aliasing coefficient interval; determine a velocity aliasing coefficient based on the aliasing coefficient subset; and determine the velocity of the one or more targets based on the velocity aliasing coefficient and the first identifier.

In a possible design, the receiver 1401 is further configured to: receive a third echo signal formed after the measurement frame is reflected by the one or more targets. The third echo signal is formed after a chirp signal sent by the first transmit antenna at a period of M2*T1 in the first burst is reflected by the one or more targets, M2<N1, and M1 and M2 are co-prime. When determining the velocity of the one or more targets based on echo signals received by the receiver 1401, the processing unit 1402 is specifically configured to: determine the velocity of the one or more targets based on the second echo signal and the third echo signal.

In a possible design, the receiver 1401 is further configured to: receive a fourth echo signal and a fifth echo signal that are formed after the measurement frame is reflected by the one or more targets. The measurement frame further includes a second burst, the fourth echo signal is formed after a chirp signal sent by a second transmit antenna of the Nt transmit antennas at a period of M3*T2 in the second burst is reflected by the one or more targets, the fifth echo signal is formed after a chirp signal sent by each of the Nt transmit antennas at a period of N2*T2 in the second burst is reflected by the one or more targets, M3<N2, T2 is a duration of each chirp signal in the second burst, and M3*T2 and M1*T1 are co-prime, or M3 and M1 are co-prime and T1 and T2 are equal. When determining the velocity of the one or more targets based on echo signals received by the receiver 1401, the processing unit 1402 is specifically configured to: determine the velocity of the one or more targets based on the second echo signal and the fourth echo signal.

In a possible design, the receiver 1401 is further configured to: receive a sixth echo signal formed after the measurement frame is reflected by the one or more targets. The measurement frame further includes a third burst, the sixth echo signal is formed after a chirp signal sent by each of the Nt transmit antennas at a period of N3*T3 in the third burst is reflected by the one or more targets, T3 is a duration of each chirp signal in the third burst, and N3*T3 and M1*T1 are co-prime, or N3 and M1 are co-prime and T1 and T3 are equal. When determining the velocity of the one or more targets based on echo signals received by the receiver 1401, the processing unit 1402 is specifically configured to: determine the velocity of the one or more targets based on the second echo signal and the sixth echo signal.

In a possible design, the receiver 1401 is further configured to: receive a seventh echo signal formed after the measurement frame is reflected by the one or more targets. The seventh echo signal is formed after a plurality of chirp signals continuously sent by the first transmit antenna within a time of N1*T1 in the first burst are reflected by the one or more targets. When determining the velocity of the one or more targets based on echo signals received by the receiver 1401, the processing unit 1402 is specifically configured to: determine the velocity of the one or more targets based on the second echo signal and the seventh echo signal.

It should be noted that, the signal processing apparatus 1400 shown in FIG. 14 may be configured to perform the signal processing method shown in FIG. 12. For an implementation that is not described in detail in the signal processing apparatus 1400, refer to related descriptions in the signal processing method shown in FIG. 12.

Figure 15:
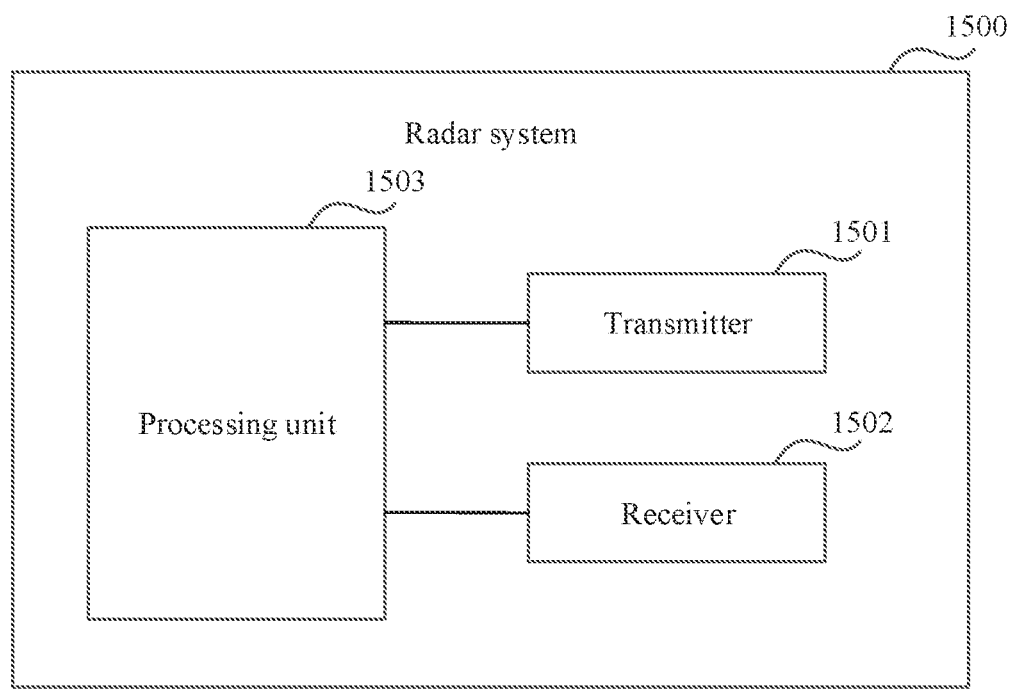
FIG. 15 is a schematic diagram of a structure of a radar system according to an embodiment of this application.

Based on a same inventive concept, an embodiment of this application further provides a radar system. Referring to FIG. 15, the radar system 1500 includes a transmitter 1501, a receiver 1502, and a processing unit 1503.

The transmitter 1501 includes Nt transmit antennas, the transmitter 1501 is configured to send a measurement frame, the measurement frame is used to measure a velocity of a target, and the measurement frame includes a first burst. In the first burst, each of the Nt transmit antennas is configured to send a chirp signal at a period of N1*T1, N1>Nt, and T1 is a duration of each chirp signal in the first burst.

The receiver 1502 is configured to receive a first echo signal and a second echo signal that are formed after the measurement frame sent by the transmitter is reflected by one or more targets. The first echo signal is formed after a chirp signal sent by each transmit antenna at a period of N1*T1 in the first burst is reflected by the one or more targets, and the second echo signal is formed after another chirp signal sent by a first transmit antenna is reflected by the one or more targets.

The processing unit 1503 is configured to determine a velocity of the one or more targets based on echo signals received by the receiver 1502.

Specifically, the transmitter 1501 may be further configured to perform another operation performed by the transmitter in the method shown in FIG. 3. The receiver 1502 may be further configured to perform another operation performed by the receiver in the method shown in FIG. 12. The processing unit 1503 may be further configured to perform another operation performed by the processing unit in the method shown in FIG. 12. Details are not described herein again.

Definitely, a person skilled in the art can make various modifications and variations to the embodiments of this application without departing from the scope of the embodiments of this application. In this way, this application is intended to cover these modifications and variations of the embodiments of this application provided that they fall within the scope of protection defined by the following claims and their equivalent technologies.

What is claimed is:

1. A signal transmission method, applied to a multiple input multiple output (MIMO) radar, wherein the MIMO radar comprises a transmitter comprising Nt transmit antennas, and the method comprises:
  sending, by the transmitter, a measurement frame, wherein the measurement frame is used to measure a velocity of a target, and the measurement frame comprises a first burst, wherein the first burst comprises multiple repetition rounds of chirp signals and each repetition round of the multiple repetition rounds of chirp signals forms a period; wherein in the first burst, each of the Nt transmit antennas is configured to send a chirp signal at the period of N1 chirps, N1>Nt, wherein a quantity of chirp signals sent by a first transmit antenna of the Nt transmit antennas is different from a quantity of chirp signals sent by a second transmit antenna of the Nt transmit antennas, and in the period, a sum of the quantity of chirp signals sent by the first transmit antenna of the Nt transmit antennas and quantities of chirp signals sent by other transmit antennas of the Nt transmit antennas equals to N1.

2. The method according to claim 1, wherein in the first burst, the first transmit antenna of the Nt transmit antennas is configured to further send a chirp signal at a first period of M1*T1, M1<N1, and T1 is a duration of each chirp signal in the first burst.

3. The method according to claim 2, wherein in the first burst, the first transmit antenna is configured to further send a chirp signal at a second period of M2*T1, M2<N1, and M1 and M2 are co-prime.

4. The method according to claim 1, wherein the measurement frame further comprises a second burst, wherein
  in the second burst, each of the Nt transmit antennas is configured to send a chirp signal at a third period of N2*T2, the second transmit antenna of the Nt transmit antennas is configured to send a chirp signal at a fourth period of M3*T2, M3<N2, T2 is a duration of each chirp signal in the second burst, and M3*T2 and M1*T1 are co-prime, or M3 and M1 are co-prime and T1 and T2 are equal and T1 is a duration of each chirp signal in the first burst.

5. The method according to claim 1, wherein the measurement frame further comprises a third burst, wherein,
  in the third burst, each of the Nt transmit antennas is configured to send a chirp signal at a fifth period of N3*T3, T1 is a duration of each chirp signal in the first burst, T3 is a duration of each chirp signal in the third burst, and N3*T3 and M1*T1 are co-prime, or N3 and M1 are co-prime and T1 and T3 are equal.

6. The method according to claim 1, wherein at least one of the Nt transmit antennas continuously sends two chirp signals in the first burst.

7. The method according to claim 1, wherein the measurement frame is a frequency modulated continuous wave (FMCW).

8. The method according to claim 1, wherein the MIMO radar further comprises at least one processor, and the method further comprises:
  determining, by the at least one processor, a configuration of the measurement frame; and
  sending, by the at least one processor, the configuration of the measurement frame to a monolithic microwave integrated circuit (MMIC) through an interface, wherein the MMIC is configured to enable, based on the configuration of the measurement frame, the transmitter to send the measurement frame.

9. A signal processing method, applied to a MIMO radar, wherein the MIMO radar comprises a transmitter, a receiver, and at least one processor, the transmitter comprises Nt transmit antennas, and the method comprises:
  receiving, by the receiver, a first echo signal and a second echo signal that are formed after a measurement frame sent by the transmitter is reflected by one or more targets, wherein the measurement frame comprises a first burst, wherein the first burst comprises multiple repetition rounds of chirp signals and each repetition round of the multiple repetition rounds of chirp signals forms a period; wherein the first echo signal is formed after a chirp signal sent by each of the Nt transmit antennas at the period of N1 chirps in the first burst is reflected by the one or more targets, and the second echo signal is formed after another chirp signal sent by a first transmit antenna of the Nt transmit antennas is reflected by the one or more targets, N1>Nt, and a quantity of chirp signals sent by the first transmit antenna of the Nt transmit antennas is different from a quantity of chirp signals sent by a second transmit antenna of the Nt transmit antennas, and in the period, a sum of the quantity of chirp signals sent by the first transmit antenna of the Nt transmit antennas and quantities of chirp signals sent by other transmit antennas of the Nt transmit antennas equals to N1; and
  determining, by the at least one processor, a velocity of the one or more targets based on the first echo signal and the second echo signal.

10. The method according to claim 9, wherein the second echo signal is formed after a chirp signal sent by the first transmit antenna at a first period of M1*T1 is reflected by the one or more targets, M1<N1, and T1 is a duration of each chirp signal in the first burst.

11. The method according to claim 10, wherein the determining, by the at least one processor, a velocity of the one or more targets based on the first echo signal and the second echo signal comprises:
  determining, by the at least one processor, a first identifier based on the first echo signal, wherein the first identifier is used to indicate a first distance measurement value and a first velocity measurement value of the one or more targets;
  determining, by the at least one processor, a second identifier based on the second echo signal, wherein the second identifier is used to indicate a second distance measurement value and a second velocity measurement value of the one or more targets; and
  determining, by the at least one processor, the velocity of the one or more targets based on the first identifier and the second identifier.

12. The method according to claim 11, wherein the determining, by the at least one processor, the velocity of the one or more targets based on the first identifier and the second identifier comprises:
- determining, by the at least one processor based on N1, a first aliasing coefficient interval corresponding to the first identifier;
- determining, by the at least one processor based on M1, a second aliasing coefficient interval corresponding to the second identifier;
- determining, by the at least one processor based on the first identifier and the second identifier, an aliasing coefficient subset corresponding to the second aliasing coefficient interval in the first aliasing coefficient interval;
- determining, by the at least one processor, a velocity aliasing coefficient based on the aliasing coefficient subset; and
- determining, by the at least one processor, the velocity of the one or more targets based on the velocity aliasing coefficient and the first identifier.

13. A signal transmission apparatus, comprising a transmitter and at least one processor; and
one or more memories including computer-executable instructions that, when executed by the at least one processor, cause the apparatus to:
send, by the transmitter, a measurement frame, wherein the transmitter comprises Nt transmit antennas, the measurement frame is used to measure a velocity of a target, and the measurement frame comprises a first burst, wherein the first burst comprises multiple repetition rounds of chirp signals and each repetition round of the multiple repetition rounds of chirp signals forms a period; wherein in the first burst, each of the Nt transmit antennas is configured to send a chirp signal at the period of N1 chirps, N1>Nt, and wherein a quantity of chirp signals sent by a first transmit antenna of the Nt transmit antennas is different from a quantity of chirp signals sent by a second transmit antenna of the Nt transmit antennas, and in the period, a sum of the quantity of chirp signals sent by the first transmit antenna of the Nt transmit antennas and quantities of chirp signals sent by other transmit antennas of the Nt transmit antennas equals to N1.

14. The apparatus according to claim 13, wherein in the first burst, the first transmit antenna of the Nt transmit antennas is further configured to send a chirp signal at a first period of M1*T1, M1<N1, and T1 is a duration of each chirp signal in the first burst.

15. The apparatus according to claim 14, wherein in the first burst, the first transmit antenna is further configured to send a chirp signal at a second period of M2*T1, M2<N1, and M1 and M2 are co-prime.

16. The apparatus according to claim 13, wherein the measurement frame further comprises a second burst, wherein
in the second burst, each of the Nt transmit antennas is configured to send a chirp signal at a third period of N2*T2, the second transmit antenna of the Nt transmit antennas is configured to send a chirp signal at a fourth period of M3*T2, M3<N2, T2 is a duration of each chirp signal in the second burst, and M3*T2 and M1*T1 are co-prime, or M3 and M1 are co-prime and T1 and T2 are equal and T1 is a duration of each chirp signal in the first burst.

17. The apparatus according to claim 13, wherein the measurement frame further comprises a third burst, wherein in the third burst, each of the Nt transmit antennas is configured to send a chirp signal at a fifth period of N3*T3, T1 is a duration of each chirp signal in the first burst, T3 is a duration of each chirp signal in the third burst, and N3*T3 and M1*T1 are co-prime, or N3 and M1 are co-prime and T1 and T3 are equal.

18. The apparatus according to claim 13, wherein at least one of the Nt transmit antennas continuously sends two chirp signals in the first burst.

19. The apparatus according to claim 13, wherein the measurement frame is a frequency modulated continuous wave (FMCW).

20. The apparatus according to claim 13, wherein the apparatus further comprises:
- receiving, by a monolithic microwave integrated circuit (MMIC), a configuration of the measurement frame; and
- enabling, by the MMIC and based on the configuration of the measurement frame, the transmitter to send the measurement frame.

21. A radar system, comprising a transmitter, a receiver and at least one processor; and
one or more memories including computer-executable instructions that, when executed by the at least one processor, cause the radar system to:
send, by the transmitter, a measurement frame, wherein the transmitter comprises Nt transmit antennas, wherein the measurement frame is used to measure a velocity of a target, and the measurement frame comprises a first burst, wherein the first burst comprises multiple repetition rounds of chirp signals and each repetition round of the multiple repetition rounds of chirp signals forms a period; wherein in the first burst, each of the Nt transmit antennas is configured to send a chirp signal at the period of N1 chirps, N1>Nt, and wherein a quantity of chirp signals sent by a first transmit antenna of the Nt transmit antennas is different from a quantity of chirp signals sent by a second transmit antenna of the Nt transmit antennas, and in the period, a sum of the quantity of chirp signals sent by the first transmit antenna of the Nt transmit antennas and quantities of chirp signals sent by other transmit antennas of the Nt transmit antennas equals to N1;
receive, by the receiver, a first echo signal and a second echo signal that are formed after the measurement frame is reflected by one or more targets, wherein the first echo signal is formed after a chirp signal sent by each transmit antenna at the period of N1 chirps in the first burst is reflected by the one or more targets, and the second echo signal is formed after another chirp signal sent by the first transmit antenna is reflected by the one or more targets; and
determine, by the at least one processor, a velocity of the one or more targets based on the first echo signal and the second echo signal.

22. The radar system according to claim 21, wherein the second echo signal is formed after a chirp signal sent by the first transmit antenna at a first period of M1*T1 is reflected by the one or more targets, M1<N1, and T1 is a duration of each chirp signal in the first burst.

23. The radar system according to claim 22, wherein when determining the velocity of the one or more targets based on the first echo signal and the second echo signal, the computer-executable instructions, when executed by the at least one processor, cause the radar system to:
determine a first identifier based on the first echo signal, wherein the first identifier is used to indicate a first distance measurement value and a first velocity measurement value of the one or more targets;

determine a second identifier based on the second echo signal, wherein the second identifier is used to indicate a second distance measurement value and a second velocity measurement value of the one or more targets; and determine the velocity of the one or more targets based on the first identifier and the second identifier.

24. The radar system according to claim 23, wherein when determining the velocity of the one or more targets based on the first identifier and the second identifier, the computer-executable instructions, when executed by the at least one processor, cause the radar system to:

determine, based on N1, a first aliasing coefficient interval corresponding to the first identifier;

determine, based on M1, a second aliasing coefficient interval corresponding to the second identifier;

determine, based on the first identifier and the second identifier, an aliasing coefficient subset corresponding to the second aliasing coefficient interval in the first aliasing coefficient interval;

determine a velocity aliasing coefficient based on the aliasing coefficient subset; and determine the velocity of the one or more targets based on the velocity aliasing coefficient and the first identifier.

25. The method according to claim 1, wherein the duration of each chirp signal comprises a sweep time and an idle time.

26. The method according to claim 1, a duty cycle in the measurement frame is about 82%.

* * * * *